(12) United States Patent
Suzuki et al.

(10) Patent No.: US 9,909,794 B2
(45) Date of Patent: *Mar. 6, 2018

(54) VEHICULAR AIR-CONDITIONING DEVICE

(71) Applicant: Sanden Holdings Corporation, Isesaki-shi, Gunma (JP)

(72) Inventors: Kenichi Suzuki, Isesaki (JP); Ryo Miyakoshi, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 180 days.

This patent is subject to a terminal disclaimer.

(21) Appl. No.: 14/890,770

(22) PCT Filed: May 27, 2014

(86) PCT No.: PCT/JP2014/063963
§ 371 (c)(1),
(2) Date: Nov. 12, 2015

(87) PCT Pub. No.: WO2014/192740
PCT Pub. Date: Dec. 4, 2014

(65) Prior Publication Data
US 2016/0084555 A1 Mar. 24, 2016

(30) Foreign Application Priority Data

May 28, 2013 (JP) ................................. 2013-112086

(51) Int. Cl.
*F25B 49/02* (2006.01)
*F25B 47/02* (2006.01)
(Continued)

(52) U.S. Cl.
CPC ......... *F25B 49/02* (2013.01); *B60H 1/00385* (2013.01); *B60H 1/00785* (2013.01);
(Continued)

(58) Field of Classification Search
CPC ... B60H 1/00785; B60H 1/00921; F25B 6/04; F25B 47/02; F25B 47/022; F25B 49/02;
(Continued)

(56) References Cited

U.S. PATENT DOCUMENTS

| 6,430,951 B1 * | 8/2002 | Iritani ............... B60H 1/00021 62/160 |
| 2011/0016896 A1 * | 1/2011 | Oomura ............. B60H 1/00785 62/155 |

(Continued)

FOREIGN PATENT DOCUMENTS

| CN | 102889653 A | 1/2013 |
| CN | 102958723 A | 3/2013 |

(Continued)

OTHER PUBLICATIONS

The State Intellectual Property Office of the People's Republic of China, The Second Office Action for Patent Application No. CN 201480030551.0, dated May 4, 2017.
(Continued)

*Primary Examiner* — Marc Norman
(74) *Attorney, Agent, or Firm* — Baker Botts L.L.P.

(57) ABSTRACT

There is disclosed an air-conditioning device of a so-called heat pump system which acquires comfortable heating of a vehicle interior by preventing or inhibiting frost formation to an outdoor heat exchanger. A controller calculates a maximum heating capability predicted value without frosting QmaxNfst as a target value of a maximum heating capability which can be generated by a radiator 4 in a range in which an outdoor heat exchanger 7 is not frosted, and controls heating by the radiator 4 and heating by a heating medium-air heat exchanger 40 of a heating medium circulating circuit 23 on the basis of the maximum heating capability predicted value without frosting QmaxNfst and a required heating capability Qtgt which is the heating capability required for
(Continued)

the radiator 4 to achieve the required heating capability Qtgt without causing frost formation to the outdoor heat exchanger 7.

11 Claims, 15 Drawing Sheets

(51) Int. Cl.
*B60H 1/00* (2006.01)
*F25B 5/04* (2006.01)
*F25B 6/04* (2006.01)
*F25B 9/00* (2006.01)
*F25B 40/00* (2006.01)

(52) U.S. Cl.
CPC ......... *B60H 1/00921* (2013.01); *F25B 47/02* (2013.01); *F25B 47/022* (2013.01); *F25B 5/04* (2013.01); *F25B 6/04* (2013.01); *F25B 9/008* (2013.01); *F25B 40/00* (2013.01); *F25B 2309/061* (2013.01); *F25B 2339/0441* (2013.01); *F25B 2341/0662* (2013.01); *F25B 2400/0403* (2013.01); *F25B 2500/19* (2013.01); *F25B 2600/0251* (2013.01); *F25B 2700/1931* (2013.01); *F25B 2700/1933* (2013.01); *F25B 2700/2104* (2013.01); *F25B 2700/2106* (2013.01); *F25B 2700/21151* (2013.01); *F25B 2700/21161* (2013.01); *F25B 2700/21173* (2013.01)

(58) Field of Classification Search
CPC ........ F25B 2500/19; F25B 2700/21161; F25B 2700/21173
See application file for complete search history.

(56) References Cited

U.S. PATENT DOCUMENTS

| | | | |
|---|---|---|---|
| 2013/0019615 A1 | 1/2013 | Choi et al. | |
| 2013/0227973 A1* | 9/2013 | Kang | F25B 47/022 62/80 |
| 2016/0033193 A1* | 2/2016 | Kang | F25B 47/022 165/202 |
| 2016/0059666 A1* | 3/2016 | Chen | F28F 9/00 62/238.7 |
| 2016/0185185 A1* | 6/2016 | Suzuki | B60H 1/00921 237/5 |
| 2016/0193896 A1* | 7/2016 | Miyakoshi | B60H 1/00385 62/155 |
| 2016/0332505 A1* | 11/2016 | Yamanaka | B60H 1/03 |

FOREIGN PATENT DOCUMENTS

| | | |
|---|---|---|
| CN | 103158486 A | 6/2013 |
| JP | 2000-343934 A | 12/2000 |
| JP | 2001-246930 A | 9/2001 |
| JP | 3985384 B2 | 10/2007 |
| JP | 2012-144177 A | 8/2012 |
| JP | 2012-176658 A | 9/2012 |
| JP | 2012-176660 A | 9/2012 |
| WO | 2012098966 A1 | 7/2012 |

OTHER PUBLICATIONS

The State Intellectual Property Office of People's Republic of China, First Office Action for Patent Application No. CN 201480030551.0, dated Oct. 10, 2016.
Japan Patent Office, Notification of Reasons for Refusal for Patent Application No. JP 2013-112086, dated Nov. 15, 2016.

\* cited by examiner

VEHICULAR AIR-CONDITIONING DEVICE

CROSS-REFERENCE TO RELATED APPLICATIONS

This application is a U.S. National Stage Patent Application under 37 U.S.C. § 371 of International Patent Application No. PCT/JP2014/063963, filed on May 27, 2014, which claims the benefit of Japanese Patent Application No. JP 2013-112086, filed on May 28, 2013, the disclosures of which are incorporated herein by reference in their entirety.

TECHNICAL FIELD

The present invention relates to an air-conditioning device of a heat pump system which conditions air in a vehicle interior, and more particularly, it relates to an air-conditioning device applicable to a hybrid car or an electric car.

BACKGROUND ART

Due to actualization of environmental problems in recent years, hybrid cars and electric cars have spread. Furthermore, as an air-conditioning device which is applicable to such a vehicle, there has been developed an air-conditioning device which includes a compressor to compress and discharge a refrigerant, a radiator (a condenser) disposed on a vehicle interior side to let the refrigerant radiate heat, a heat absorber (an evaporator) disposed on the vehicle interior side to let the refrigerant absorb heat, and an outdoor heat exchanger disposed outside the vehicle interior to let the refrigerant radiate or absorb heat, and which changes and executes respective modes such as a heating mode in which the refrigerant discharged from the compressor radiates heat in the radiator and the refrigerant by which heat has been radiated in this radiator absorbs heat in the outdoor heat exchanger, a dehumidifying mode in which the refrigerant discharged from the compressor radiates heat in the radiator and the refrigerant by which heat has been radiated in the radiator absorbs heat in the heat absorber, and a cooling mode in which the refrigerant discharged from the compressor radiates heat in the outdoor heat exchanger and absorbs heat in the heat absorber (e.g., see Patent Document 1).

CITATION LIST

Patent Documents

Patent Document 1: Japanese Patent No. 3985384

SUMMARY OF THE INVENTION

Problems to be Solved by the Invention

Here, in the above heating mode, an outdoor heat exchanger functions as an evaporator of a refrigerant. Therefore, when the heating mode is executed by starting a vehicular air-conditioning device, water in outdoor air adheres as frost to the outdoor heat exchanger and grows depending on conditions of a temperature and a humidity of the outdoor air. When the frost formation to the outdoor heat exchanger occurs in the heating mode, the frost becomes an insulating material. Therefore, a heat exchange performance with the outdoor air remarkably deteriorates, heat cannot be absorbed from the outdoor air, and hence there is the problem that a required heating capability cannot be obtained.

The present invention has been developed to solve such conventional technical problems, and an object thereof is to acquire comfortable heating of a vehicle interior by preventing or inhibiting frost formation to an outdoor heat exchanger in an air-conditioning device of a so-called heat pump system.

Means for Solving the Problems

A vehicular air-conditioning device of the present invention includes a compressor which compresses a refrigerant, an air flow passage through which air to be supplied into a vehicle interior flows, a radiator which lets the refrigerant radiate heat to heat the air to be supplied from the air flow passage into the vehicle interior, a heat absorber which lets the refrigerant absorb heat to cool the air to be supplied from the air flow passage into the vehicle interior, an outdoor heat exchanger disposed outside the vehicle interior to let the refrigerant radiate or absorb heat, and control means, this control means being configured to execute at least a heating mode in which the refrigerant discharged from the compressor radiates heat in the radiator and the refrigerant by which heat has been radiated is decompressed and then absorbs heat in the outdoor heat exchanger, the vehicular air-conditioning device including auxiliary heating means for heating the air to be supplied from the air flow passage into the vehicle interior, and being characterized in that the control means calculates a maximum heating capability predicted value without frosting QmaxNfst which is a target value of a maximum heating capability to be generated by the radiator in a range in which the outdoor heat exchanger is not frosted, and the control means controls the heating by the radiator and the heating by the auxiliary heating means on the basis of the maximum heating capability predicted value without frosting QmaxNfst and a required heating capability Qtgt which is the heating capability required for the radiator to achieve the required heating capability Qtgt without causing frost formation to the outdoor heat exchanger.

The vehicular air-conditioning device of the invention of claim 2 is characterized in that in the above invention, the control means defines a target heating capability TGQhp of the radiator as the maximum heating capability predicted value without frosting QmaxNfst, and complements a shortage of the heating capability to the required heating capability Qtgt by the heating by the auxiliary heating means, when the maximum heating capability predicted value without frosting QmaxNfst is smaller than the required heating capability Qtgt.

The vehicular air-conditioning device of the invention of claim 3 is characterized in that in the above respective inventions, the control means defines the target heating capability TGQhp of the radiator as the required heating capability Qtgt, and stops the heating by the auxiliary heating means, when the maximum heating capability predicted value without frosting QmaxNfst is the required heating capability Qtgt or more.

The vehicular air-conditioning device of the invention of claim 4 is characterized in that in the above respective inventions, the control means calculates the maximum heating capability predicted value without frosting QmaxNfst on the basis of an outdoor air temperature or on the basis of time, solar radiation, rainfall, location, and weather conditions in addition to the outdoor air temperature.

The vehicular air-conditioning device of the invention of claim 5 is characterized in that the control means executes the control of each of the above inventions immediately after startup.

The vehicular air-conditioning device of the invention of claim 6 is characterized in that in the above respective inventions, the control means has frost formation condition estimating means for estimating a frost formation condition to the outdoor heat exchanger, and in a case where it is not immediately after the startup, the control means executes the heating by the auxiliary heating means on the basis of the estimation of this frost formation condition estimating means, when the frost formation to the outdoor heat exchanger occurs or when the frost formation to the outdoor heat exchanger is predicted.

The vehicular air-conditioning device of the invention of claim 7 is characterized in that in the above invention, the control means calculates a target heating capability TGQech of the auxiliary heating means for inhibiting or preventing the frost formation to the outdoor heat exchanger on the basis of a degree of the frost formation to the outdoor heat exchanger, and obtains a value of the target heating capability TGQhp of the radiator by subtracting the target heating capability TGQech of the auxiliary heating means from the required heating capability Qtgt.

The vehicular air-conditioning device of the invention of claim 8 is characterized in that in the above invention, the control means stops an operation of the compressor, when the target heating capability TGQhp of the radiator is smaller than a predetermined value.

The vehicular air-conditioning device of the invention of claim 9 is characterized in that in the inventions of claim 6 to claim 8, the control means lowers the heating by the auxiliary heating means gradually or in stages and finally stops the heating, when it is estimated that the outdoor heat exchanger is not frosted on the basis of the estimation of the frost formation condition estimating means.

The vehicular air-conditioning device of the invention of claim 10 is characterized in that in the inventions of claim 6 to claim 9, the control means estimates the frost formation condition or the degree of the frost formation to the outdoor heat exchanger on the basis of a refrigerant evaporation temperature TXO of the outdoor heat exchanger and a refrigerant evaporation temperature TXObase of the outdoor heat exchanger in non-frosting.

The vehicular air-conditioning device of the invention of claim 11 is characterized in that in the above respective inventions, the auxiliary heating means is constituted of a heating medium circulating circuit which has a heating medium-air heat exchanger to heat the air to be supplied from the air flow passage to the vehicle interior, an electric heater and circulating means and which circulates a heating medium heated by the electric heater through the heating medium-air heat exchanger by the circulating means.

Advantageous Effect of the Invention

According to the present invention, in a vehicular air-conditioning device including a compressor which compresses a refrigerant, an air flow passage through which air to be supplied into a vehicle interior flows, a radiator which lets the refrigerant radiate heat to heat the air to be supplied from the air flow passage into the vehicle interior, a heat absorber which lets the refrigerant absorb heat to cool the air to be supplied from the air flow passage into the vehicle interior, an outdoor heat exchanger disposed outside the vehicle interior to let the refrigerant radiate or absorb heat, and control means, this control means being configured to execute at least a heating mode in which the refrigerant discharged from the compressor radiates heat in the radiator and the refrigerant by which heat has been radiated is decompressed and then absorbs heat in the outdoor heat exchanger, the vehicular air-conditioning device including auxiliary heating means for heating the air to be supplied from the air flow passage into the vehicle interior, and being characterized in that the control means calculates a maximum heating capability predicted value without frosting QmaxNfst which is a target value of a maximum heating capability to be generated by the radiator in a range in which the outdoor heat exchanger is not frosted, and the control means controls the heating by the radiator and the heating by the auxiliary heating means on the basis of the maximum heating capability predicted value without frosting QmaxNfst and a required heating capability Qtgt which is the heating capability required for the radiator to achieve the required heating capability Qtgt without causing frost formation to the outdoor heat exchanger. Therefore, even when a frost point which is determined in accordance with conditions of a temperature and humidity of outdoor air and at which the frost formation to the outdoor heat exchanger occurs cannot be detected, the required heating capability Qtgt is achieved by coordinated heating of the radiator and the auxiliary heating means without causing frost formation to the outdoor heat exchanger, and it is possible to realize comfortable heating of the vehicle interior.

In this case, as in the invention of claim 2, the control means defines a target heating capability TGQhp of the radiator as the maximum heating capability predicted value without frosting QmaxNfst, and complements a shortage of the heating capability to the required heating capability Qtgt by the heating by the auxiliary heating means, when the maximum heating capability predicted value without frosting QmaxNfst is smaller than the required heating capability Qtgt, and as in the invention of claim 3, the control means defines the target heating capability TGQhp of the radiator as the required heating capability Qtgt, and stops the heating by the auxiliary heating means, when the maximum heating capability predicted value without frosting QmaxNfst is the required heating capability Qtgt or more. In this case, it is possible to minimize deterioration of an efficiency due to the heating by the auxiliary heating means. In consequence, especially in an electric car, it is possible to effectively inhibit the disadvantage that a cruising range decreases.

Additionally, as in the invention of claim 4, the control means calculates the maximum heating capability predicted value without frosting QmaxNfst on the basis of an outdoor air temperature or on the basis of time, solar radiation, rainfall, location, and weather conditions in addition to the outdoor air temperature, and hence it is possible to precisely estimate the maximum heating capability predicted value without frosting QmaxNfst at which the outdoor heat exchanger is not frosted, i.e., it is possible to precisely estimate a frost point as a result and to effectively prevent the frost formation to the outdoor heat exchanger.

Further, as in the invention of claim 5, the control means executes the above control immediately after startup, and hence it is possible to prevent the disadvantage that the frost starts to be formed to the outdoor heat exchanger by the startup from a stopped state, i.e., from a state where the outdoor heat exchanger is not frosted yet, and it is possible to inhibit the growth of the formed frost due to the subsequent running as much as possible. In addition, the complementing by the auxiliary heating means is performed by estimating the frost point only immediately after the startup, and hence it is possible to achieve reduction of power consumption.

Additionally, as in the invention of claim 6, the control means has frost formation condition estimating means for estimating a frost formation condition to the outdoor heat exchanger, and in a case where it is not immediately after the startup, the control means executes the heating by the auxiliary heating means on the basis of the estimation of this frost formation condition estimating means, when the frost formation to the outdoor heat exchanger occurs or when the frost formation to the outdoor heat exchanger is predicted. In this case, it is possible to acquire the heating capability in the vehicle interior while effectively preventing or inhibiting the frost formation to the outdoor heat exchanger during the running after the startup.

Further, as in the invention of claim 7, the control means calculates a target heating capability TGQech of the auxiliary heating means for inhibiting or preventing the frost formation to the outdoor heat exchanger on the basis of a degree of the frost formation to the outdoor heat exchanger, and obtains a value of the target heating capability TGQhp of the radiator by subtracting the target heating capability TGQech of the auxiliary heating means from the required heating capability Qtgt, so that it is possible to precisely control the heating by the auxiliary heating means and to realize the comfortable heating of the vehicle interior while preventing or inhibiting the frost formation to the outdoor heat exchanger.

Additionally, also in this case, it is possible to minimize the deterioration of the efficiency due to the heating by the auxiliary heating means, and hence it is also possible to effectively inhibit the decrease of the cruising range of the electric car.

In this case, as in the invention of claim 8, the control means stops an operation of the compressor, when the target heating capability TGQhp of the radiator is smaller than a predetermined value, and hence the deterioration of the efficiency in a situation where the heating of the radiator is excessively small can be avoided in advance.

It is to be noted that as in the invention of claim 9, the control means lowers the heating by the auxiliary heating means gradually or in stages and finally stops the heating, when it is estimated that the outdoor heat exchanger is not frosted on the basis of the estimation of the frost formation condition estimating means, and in this case, it is possible to inhibit a rapid variance of a temperature of the air to be blown into the vehicle interior, and it is also possible to prevent or inhibit the disadvantage that the outdoor heat exchanger is transiently frosted in accordance with the rapid increase of the heating capability of the radiator.

Particularly, as in the invention of claim 10, the control means estimates the frost formation condition or the degree of the frost formation to the outdoor heat exchanger on the basis of a refrigerant evaporation temperature TXO of the outdoor heat exchanger and a refrigerant evaporation temperature TXObase of the outdoor heat exchanger in non-frosting, and in this case, it is possible to execute the above control by precisely determining the frost formation to the outdoor heat exchanger. In consequence, it is possible to precisely control the heating by the auxiliary heating means and to control power consumption increase.

Further, as in the invention of claim 11, the abovementioned auxiliary heating means is constituted of a heating medium circulating circuit which has a heating medium-air heat exchanger to heat the air to be supplied from the air flow passage to the vehicle interior, an electric heater and circulating means and which circulates a heating medium heated by the electric heater through the heating medium-air heat exchanger by the circulating means, and hence it is possible to realize electrically safer vehicle interior heating.

MODE FOR CARRYING OUT THE INVENTION

Hereinafter, embodiments of the present invention will be described in detail with reference to the drawings.

Embodiment 1

Figure 1:
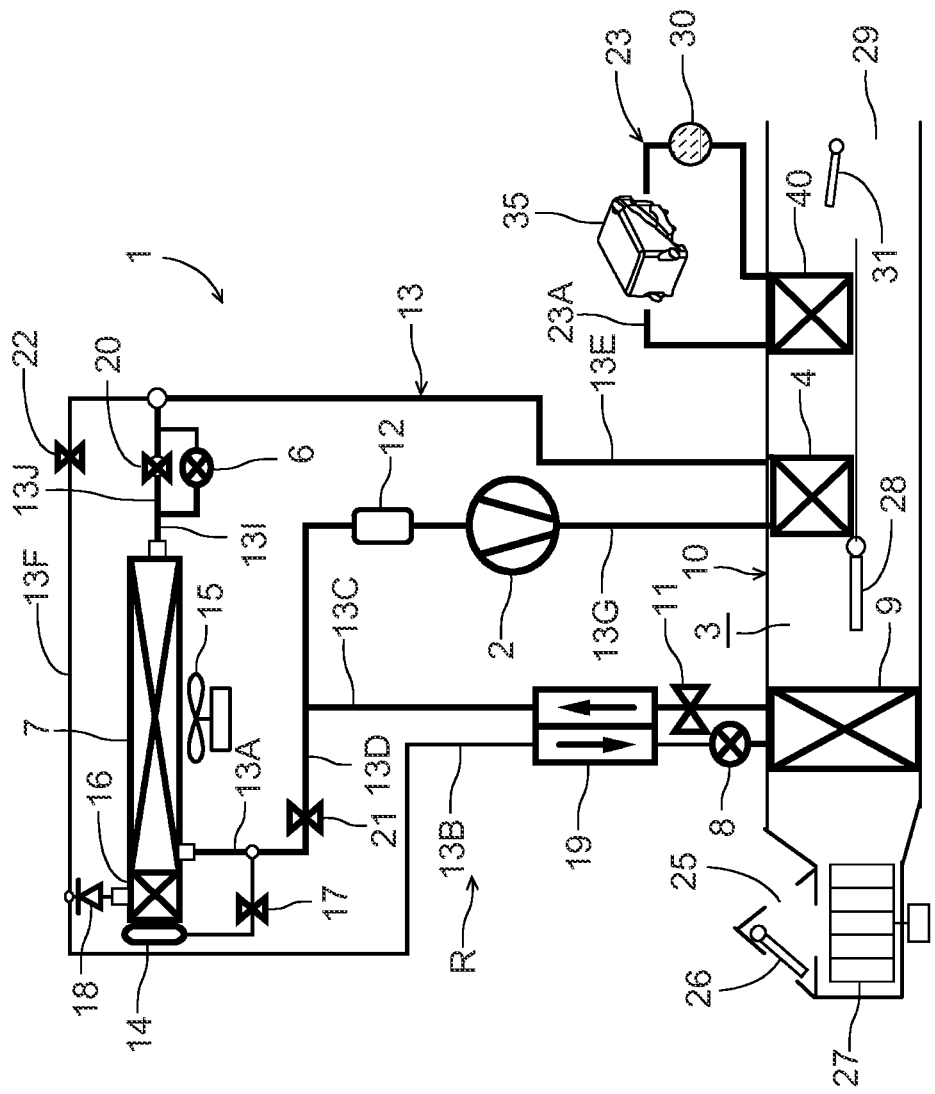
FIG. 1 is a constitutional view of a vehicular air-conditioning device of one embodiment to which the present invention is applied.

FIG. 1 shows a constitutional view of a vehicular air-conditioning device 1 of one embodiment of the present invention. A vehicle of the embodiment to which the present invention is applied is an electric car (EV) in which an engine (an internal combustion engine) is not mounted, and runs by driving an electric motor for running by a power charged in a battery (which is not shown), and the vehicular air-conditioning device 1 of the present invention is driven by the power of the battery. That is, in the electric car in which heating cannot be performed by waste heat of the engine, the vehicular air-conditioning device 1 of the embodiment performs the heating by a heat pump operation in which a refrigerant circuit is used, and further selectively executes respective operation modes of dehumidifying and heating, cooling and dehumidifying, cooling, and the like.

It is to be noted that the vehicle is not limited to the electric car, and the present invention is also effective for a so-called hybrid car in which the engine is used together with the electric motor for the running, and is, needless to say, further applicable also to a usual car which runs by the engine.

The vehicular air-conditioning device 1 of the embodiment performs air-conditioning (heating, cooling, dehumidifying, and ventilation) in the electric car, and there are successively connected, by a refrigerant pipe 13, an electric compressor 2 which compresses a refrigerant, a radiator 4 disposed in an air flow passage 3 of an HVAC unit 10 in which air in the vehicle interior is passed and circulated, to let the high-temperature high-pressure refrigerant discharged from the compressor 2 flow inside via a refrigerant pipe 13G and radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which regulates an evaporation capability in the heat absorber 9, an accumulator 12 and the like, so that a refrigerant circuit R is constituted. It is to be noted that in the outdoor heat exchanger 7, an outdoor blower 15 is disposed. The outdoor blower 15 forcibly passes the outdoor air through the outdoor heat exchanger 7 and performs the heat exchange between the outdoor air and the refrigerant, whereby the outdoor air is also passed through the outdoor heat exchanger 7 when the vehicle is stopped (i.e., a velocity VSP is 0 km/h).

In addition, the outdoor heat exchanger 7 has a receiver drier portion 14 and a subcooling portion 16 successively on a refrigerant downstream side, a refrigerant pipe 13A extended out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a bypass pipe 13J is connected in parallel with the outdoor expansion valve 6, and in the bypass pipe 13J, there is disposed a solenoid valve (an opening/closing valve) 20 which is opened in a cooling mode and allows the refrigerant to flow and bypasses the outdoor expansion valve 6. It is to be noted that a pipe 13I is interposed between the outdoor expansion valve 6 and the solenoid valve 20, and the outdoor heat exchanger 7.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in FIG. 1, 23 is a heating medium circulating circuit as auxiliary heating means disposed in the vehicular air-conditioning device 1 of the embodiment. The heating medium circulating circuit 23 includes a circulating pump 30 constituting circulating means, a heating medium heating electric heater (shown by ECH in the drawing) 35, and a heating medium-air heat exchanger 40 disposed in the air flow passage 3 on the air downstream side of the radiator 4 to the flow of the air of the air flow passage 3, and these components are successively annularly connected by a heating medium pipe 23A. It is to be noted that as the heating medium to be circulated in the heating medium circulating circuit 23, for example, water, a refrigerant such as HFO-1234yf, a coolant or the like is employed.

Further, when the circulating pump 30 is operated and the heating medium heating electric heater 35 is energized to generate heat, the heating medium heated by the heating medium heating electric heater 35 is circulated through the heating medium-air heat exchanger 40. That is, the heating medium-air heat exchanger 40 of the heating medium circulating circuit 23 is a so-called heater core, and complements the heating in the vehicle interior. Thus, the heating medium circulating circuit 23 is employed, and hence, electric safety of a passenger can improve.

Additionally, in the air flow passage 3 on the air upstream side of the radiator 4, an air mix damper 28 is disposed to regulate a degree of flow of the indoor air or the outdoor air through the radiator 4. Further, in the air flow passage 3 on an air downstream side of the radiator 4, each outlet of foot, vent or defroster (represented by an outlet 29 in FIG. 1) is formed, and in the outlet 29, an outlet changing damper 31 is disposed to perform changing control of blowing of the air from each outlet mentioned above.

Figure 2:
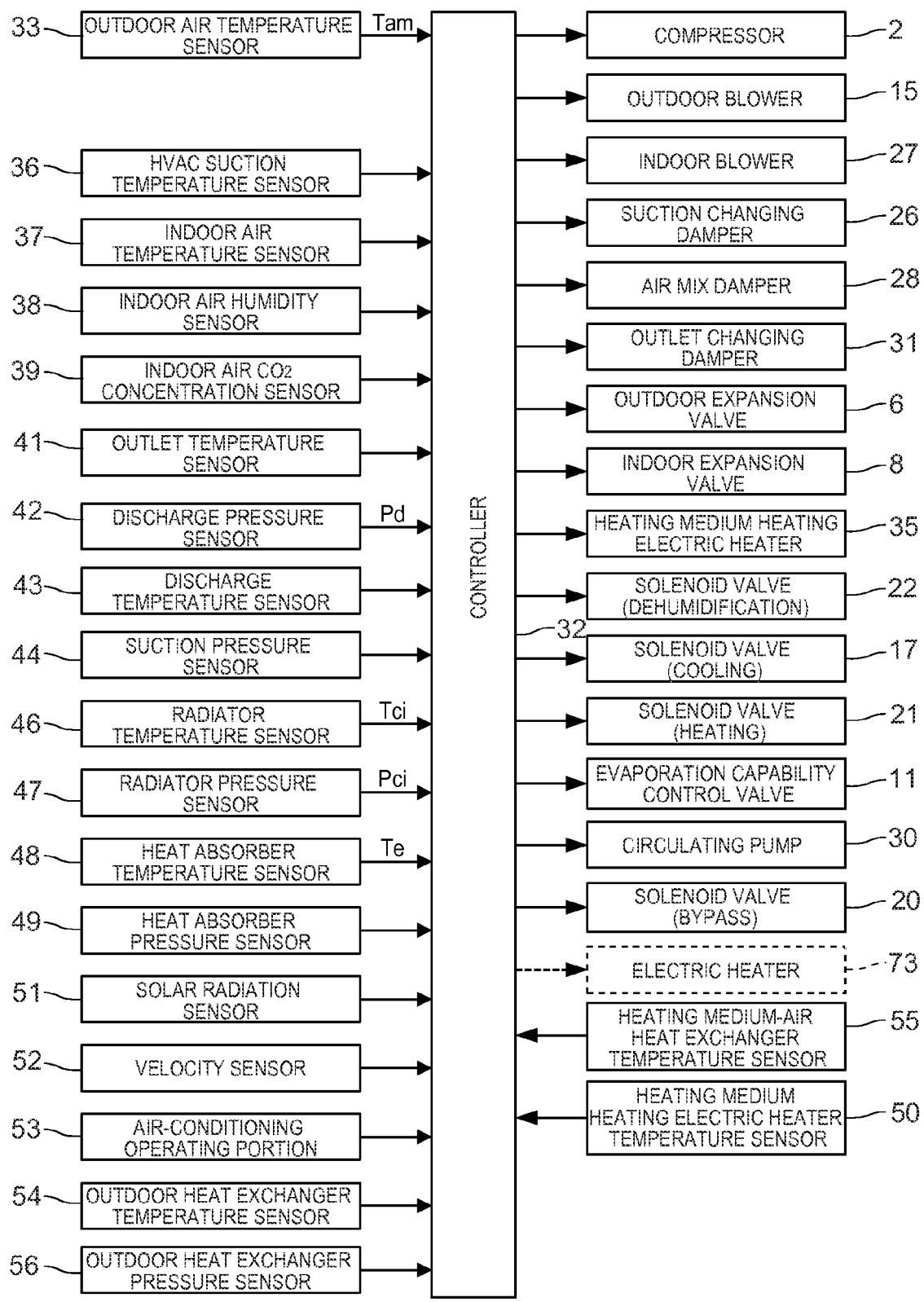
FIG. 2 is a block diagram of an electric circuit of a controller of the vehicular air-conditioning device of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an HVAC suction temperature sensor 36 which detects a temperature of the air to be sucked from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor air CO, concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air passed through the radiator 4 or the temperature of the radiator 4 itself), a radiator pressure sensor 47 which detects a refrigerant pressure of the radiator 4 (the pressure in the radiator 4 or the pressure of the refrigerant which has just flowed out from the radiator 4), a heat absorber temperature sensor 48 which detects a temperature of the heat absorber 9 (the temperature of the air passed through the heat absorber 9 or the temperature of the heat absorber 9 itself), a heat absorber pressure sensor 49 which detects a refrigerant pressure of the heat absorber 9 (the pressure in the heat absorber 9 or the pressure of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a velocity), an air-conditioning operating portion 53 to set the changing of the predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure of the refrigerant in the outdoor heat exchanger 7 or the refrigerant which has just flowed out from the outdoor heat exchanger 7).

In addition, the input of the controller 32 is further connected to respective outputs of a heating medium heating electric heater temperature sensor 50 which detects a temperature of the heating medium heating electric heater 35 of the heating medium circulating circuit 23 (the temperature of the heating medium immediately after heated by the heating medium heating electric heater 35 or a temperature of an unshown electric heater itself built in the heating medium heating electric heater 35), and a heating medium-air heat exchanger temperature sensor 55 which detects a temperature of the heating medium-air heat exchanger 40 (the temperature of the air passed through the heating medium-air heat exchanger 40 or the temperature of the heating medium-air heat exchanger 40 itself).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, the circulating pump 30, the heating medium heating electric heater 35, and the evaporation capability control valve 11. Further, the controller 32 controls these components on the basis of the outputs of the respective sensors and the setting input by the air-conditioning operating portion 53.

Next, an operation of the vehicular air-conditioning device 1 of the embodiment having the abovementioned constitution will be described. In the embodiment, the controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Flow of Refrigerant of Heating Mode

When the heating mode is selected by the controller 32 or a manual operation to the air-conditioning operating portion 53, the controller 32 opens the solenoid valve 21 and closes the solenoid valve 17, the solenoid valve 22 and the solenoid valve 20. Furthermore, the compressor 2 and the respective blowers 15 and 27 are operated, and the air mix damper 28 has a state where the air blown out from the indoor blower 27 is passed through the radiator 4 and the heating medium-air heat exchanger 40. In consequence, the high-temperature high-pressure gas refrigerant discharged from the compressor 2 flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. It is to be noted that an operation and a function of the heating medium circulating circuit 23 will be described later. The refrigerant flowing into the outdoor expansion valve 6 is decompressed and then flows into the outdoor heat exchanger 7. The refrigerant flowing into the outdoor heat exchanger 7 evaporates, and the heat is pumped up from the outdoor air passed by running or the outdoor blower 15. That is, the refrigerant circuit R becomes a heat pump (shown by HP in the drawing), and the outdoor heat exchanger 7 functions as an evaporator of the refrigerant. Further, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29 through the heating medium-air heat exchanger 40, and hence the heating in the vehicle interior is performed.

The controller 32 controls a number of revolution of the compressor 2 on the basis of a high pressure of the refrigerant circuit R which is detected by the discharge pressure sensor 42 or the radiator pressure sensor 47, also controls a valve position of the outdoor expansion valve 6 on the basis of the temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed. The controller 32 controls the number of revolution of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. The outdoor expansion valve 6 and the solenoid valve 21 are closed, whereby inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the number of revolution of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2.

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Furthermore, the compressor 2 and the respective blowers 15 and 27 are operated, and the air mix damper 28 has the state where the air blown out from the indoor blower 27 is passed through the radiator 4 and the heating medium-air heat exchanger 40. In consequence, the high-temperature high-pressure gas refrigerant discharged from the compressor 2 flows into the radiator 4. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling in the vehicle interior are performed. The controller 32 controls the number of revolution of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (a radiator pressure PCI) of the radiator 4.

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully open position (the valve position is set to an upper limit of controlling), and the air mix damper 28 has a state where the air is not passed through the radiator 4 and the heating medium-air heat exchanger 40. In consequence, the high-temperature high-pressure gas refrigerant discharged from the compressor 2 flows into the radiator 4. The air in the air flow passage 3 is not passed through the radiator 4, the air therefore only passes here, and the refrigerant flowing out from the radiator 4 flows through the refrigerant pipe 13E to reach the solenoid valve 20 and the outdoor expansion valve 6.

At this time, the solenoid valve 20 is opened and hence the refrigerant bypasses the outdoor expansion valve 6 to pass the bypass pipe 13J, and flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed. In this cooling mode, the controller 32 controls the number of revolution of the compressor 2 on the basis of the temperature of the heat absorber 9 which is detected by the heat absorber temperature sensor 48.

(6) Heating Mode and Auxiliary Heating by Heating Medium Circulating Circuit (Auxiliary Heating Means) in the Heating Mode Next, there will be described control of the compressor 2 and the outdoor expansion valve 6 in the heating mode and auxiliary heating by the heating medium circulating circuit 23 in the heating mode.

(6-1) Control of Compressor and Outdoor Expansion Valve

The controller 32 calculates a target outlet temperature TAO from the following equation (I). The target outlet temperature TAO is a target value of a temperature of air blown out from the outlet 29 into the vehicle interior.

$$TAO=(Tset-Tin)\times K+Tbal(f(Tset, SUN, Tam)) \quad (I),$$

in which Tset is a predetermined temperature in the vehicle interior which is set by the air-conditioning operating portion 53, Tin is a temperature of the air in the vehicle interior which is detected by the indoor air temperature sensor 37, K is a coefficient, and Tbal is a balance value calculated from the predetermined temperature Tset, a solar radiation amount SUN detected by the solar radiation sensor 51, and an outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature TAO becomes.

The controller 32 calculates a radiator target temperature TCO from the target outlet temperature TAO, and next calculates a radiator target pressure PCO on the basis of the radiator target temperature TCO. Further, on the basis of the radiator target pressure PCO and a refrigerant pressure (a radiator pressure) Pci of the radiator 4 which is detected by the radiator pressure sensor 47, the controller 32 calculates a number of revolution Nc of the compressor 2, and operates the compressor 2 in the number of revolution Nc. That is, the controller 32 controls the refrigerant pressure Pci of the radiator 4 in accordance with the number of revolution Nc of the compressor 2.

In addition, the controller 32 calculates a target radiator subcool degree TGSC of the radiator 4 on the basis of the target outlet temperature TAO. On the other hand, the controller 32 calculates a subcool degree (a radiator subcool degree SC) of the refrigerant in the radiator 4 on the basis of the radiator pressure Pci and the temperature (a radiator temperature Tci) of the radiator 4 which is detected by the radiator temperature sensor 46. Further, on the basis of the radiator subcool degree SC and the target radiator subcool degree TGSC, the controller calculates a target valve position of the outdoor expansion valve 6 (a target outdoor expansion valve position TGECCV). Further, the controller 32 controls the valve position of the outdoor expansion valve 6 in accordance with the target outdoor expansion valve position TGECVV.

The controller 32 performs the calculation in such a direction as to increase the target radiator subcool degree TGSC as the target outlet temperature TAO is higher, but the present invention is not limited to this example, and the controller may perform the calculation on the basis of a difference (a capability difference) between an after-mentioned required heating capability Qtgt and a heating capability Qhp, or the radiator pressure Pci, or a difference (a pressure difference) between the radiator target pressure PCO and the radiator pressure Pci. In this case, the controller 32 decreases the target radiator subcool degree TGSC, when the capability difference is smaller, the pressure difference is smaller, an air volume of the indoor blower 27 is smaller, or the radiator pressure Pci is smaller.

(6-2) Control of Heating Medium Circulating Circuit

In addition, when the controller 32 judges that the heating capability by the radiator 4 runs short in this heating mode, the controller energizes the heating medium heating electric heater 35 to generate heat, and operates the circulating pump 30, thereby executing the heating by the heating medium circulating circuit 23.

Figure 3:
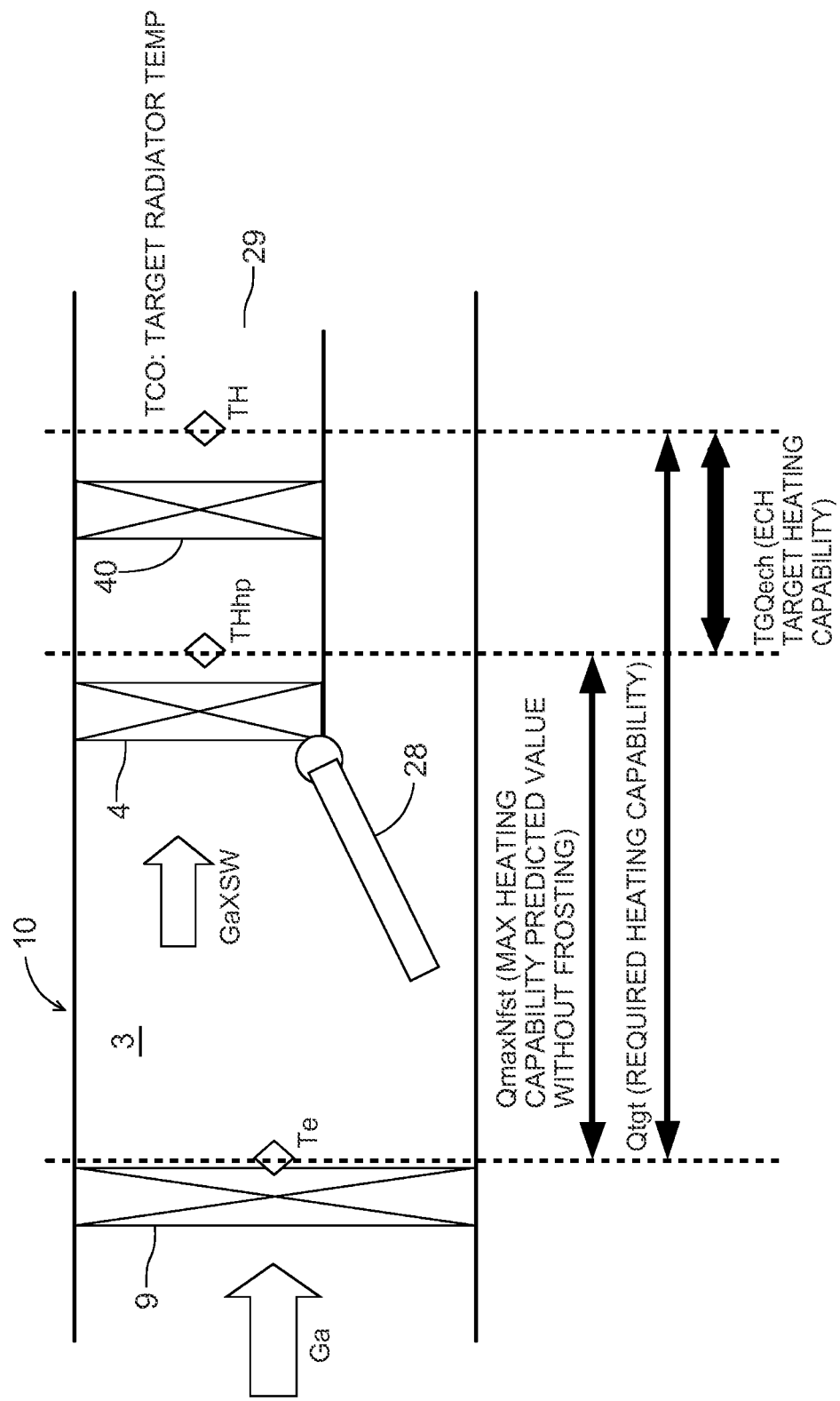
FIG. 3 is an enlarged view of an air flow passage portion of FIG. 1.

When the circulating pump 30 of the heating medium circulating circuit 23 is operated and the heating medium heating electric heater 35 is energized, the heating medium (the heating medium of a high temperature) heated by the heating medium heating electric heater 35 as described above is circulated through the heating medium-air heat exchanger 40, and hence the air passed through the radiator 4 of the air flow passage 3 is heated. FIG. 3 shows the temperatures of the respective components in the air flow passage 3 at this time. In this drawing, Ga is a mass air volume of the air flowing into the air flow passage 3, Te is the temperature of the heat absorber 9 which is detected by the heat absorber temperature sensor 48 (the temperature of the air flowing out from the heat absorber 9), GaxSW is a value obtained by multiplying the mass air volume Ga by an opening of the air mix damper 28, THhp is a temperature of the air passed through the radiator 4 which is detected by the radiator temperature sensor 46 (i.e., the radiator temperature Tci), and TH is a temperature of the air passed through the heating medium-air heat exchanger 40 which is detected by the heating medium-air heat exchanger temperature sensor 55, and in the heating mode, a target value of the temperature of the air flowing out from the heating medium-air heat exchanger 40 and blown out from the outlet 29 to the vehicle interior is the radiator target temperature TCO. It is to be noted that when the heating medium circulating circuit 23 does not operate, TH=THhp.

Next, the control of the heating medium circulating circuit 23 in the above heating mode will be described with reference to FIG. 4 to FIG. 7. In this invention, the controller 32 calculates the required heating capability Qtgt which is the heating capability required for the radiator 4 by use of Equation (II) mentioned below, and calculates a target value of a maximum heating capability to be generated by the radiator 4 in a range in which the outdoor heat exchanger 7 is not frosted by use of Equation (III), i.e., predicts and calculates a maximum heating capability predicted value without frosting QmaxNfst which is the target value of the maximum heating capability to be generated by the radiator 4 without causing the frost formation to the outdoor heat exchanger 7, when a heat pump operation is performed to let the refrigerant radiate heat in the radiator 4 and to evaporate the refrigerant in the outdoor heat exchanger 7 in an environment where the vehicle is presently placed.

$$Qtgt=(TCO-Te) \times Cpa \times \rho \times Q\text{air} \qquad (\text{II})$$

and $$Q\text{max}Nfst=f(Tam) \qquad (\text{III}),$$

in which Tam is the abovementioned outdoor air temperature detected by the outdoor air temperature sensor 33, Te is the temperature of the heat absorber 9 which is detected by the heat absorber temperature sensor 48, Cpa is specific heat [kj/kg·K] of the air flowing into the radiator 4, $\rho$ is a density (a specific volume) [kg/m$^3$] of the air flowing into the radiator 4, and Qair is a volume [m$^3$/h] of the air passing the radiator 4 (estimated from a blower voltage BLV of the indoor blower 27 or the like).

It is to be noted that in Equation (II), in place of or in addition to Qair, the temperature of the air flowing into the radiator 4 or the temperature of the air flowing out from the radiator 4 may be employed. In addition, the maximum heating capability predicted value without frosting QmaxNfst may be corrected with reference to respective environmental conditions such as time, a solar radiation amount detected by the solar radiation sensor 51, rainfall, location and weather or external information in addition to the outdoor air temperature Tam in Equation (III).

Figure 4:
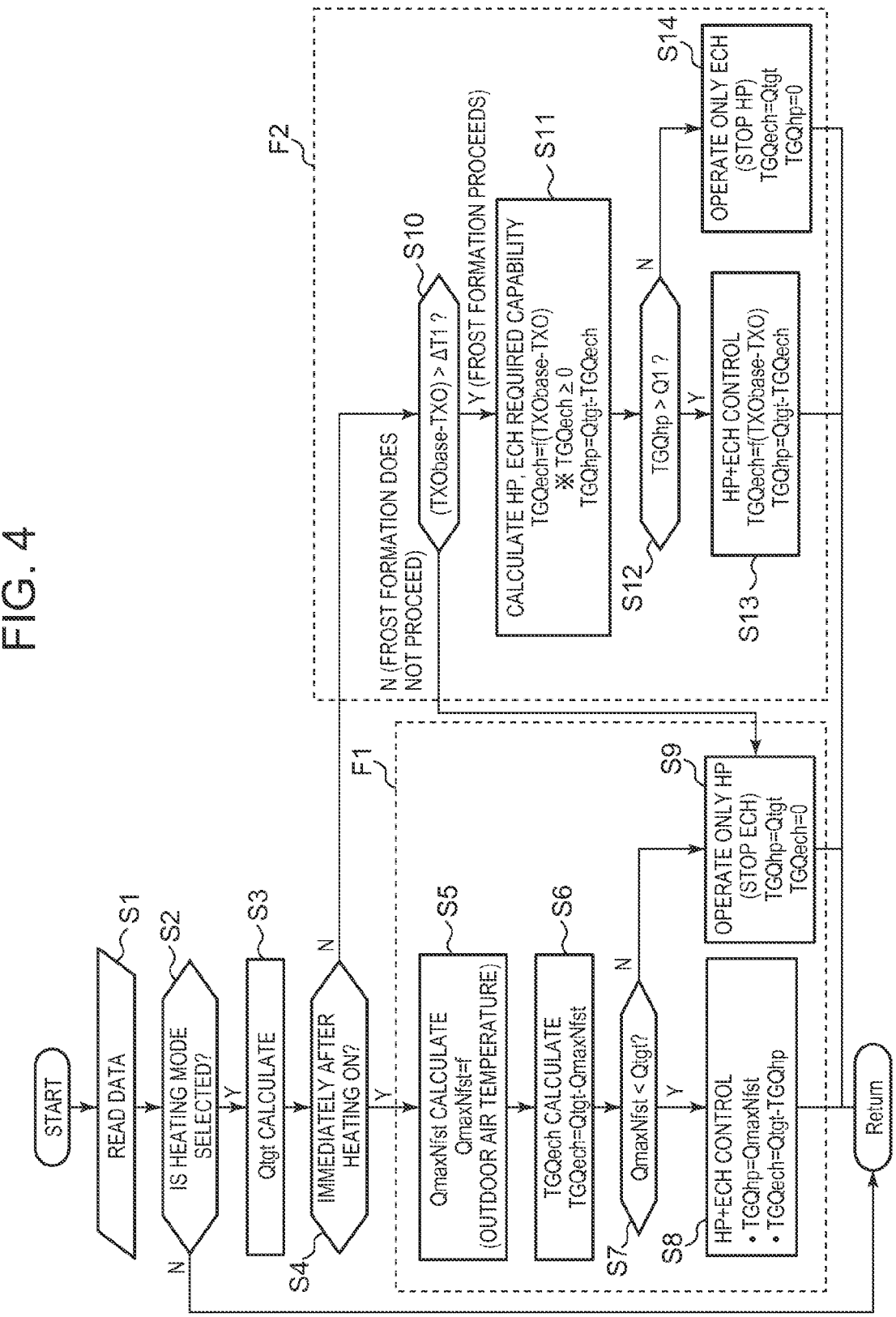
FIG. 4 is a flowchart to explain an operation of the controller of FIG. 2.

The controller 32 reads data from each sensor in step S1 of a flowchart of FIG. 4, and judges in step S2 whether or not the above heating mode is selected. Further, when the heating mode is selected, the controller 32 advances to step S3 to calculate the required heating capability Qtgt by use of Equation (II).

(6-3) Control Immediately after Startup of Heating Mode

Next, in step S4, the controller 32 judges whether or not it is immediately after startup (ON) of the heating mode now. In winter, it is judged that it is immediately after the vehicle is started, but this judgment of whether or not it is immediately after the startup is performed by judging whether or not a predetermined time or less elapses after such start of the vehicle or whether or not a predetermined time or less elapses after another mode switches to the heating mode. It is to be noted that the judgment of whether or not it is immediately after the startup does not depend on such temporal judgment, and may be performed by, for example, judging whether or not a difference Tset−Tin between a predetermined temperature Tset in the vehicle interior and a temperature Tin of the air in the vehicle interior is larger than a predetermined value (Tset−Tin>the predetermined value).

Figure 5:
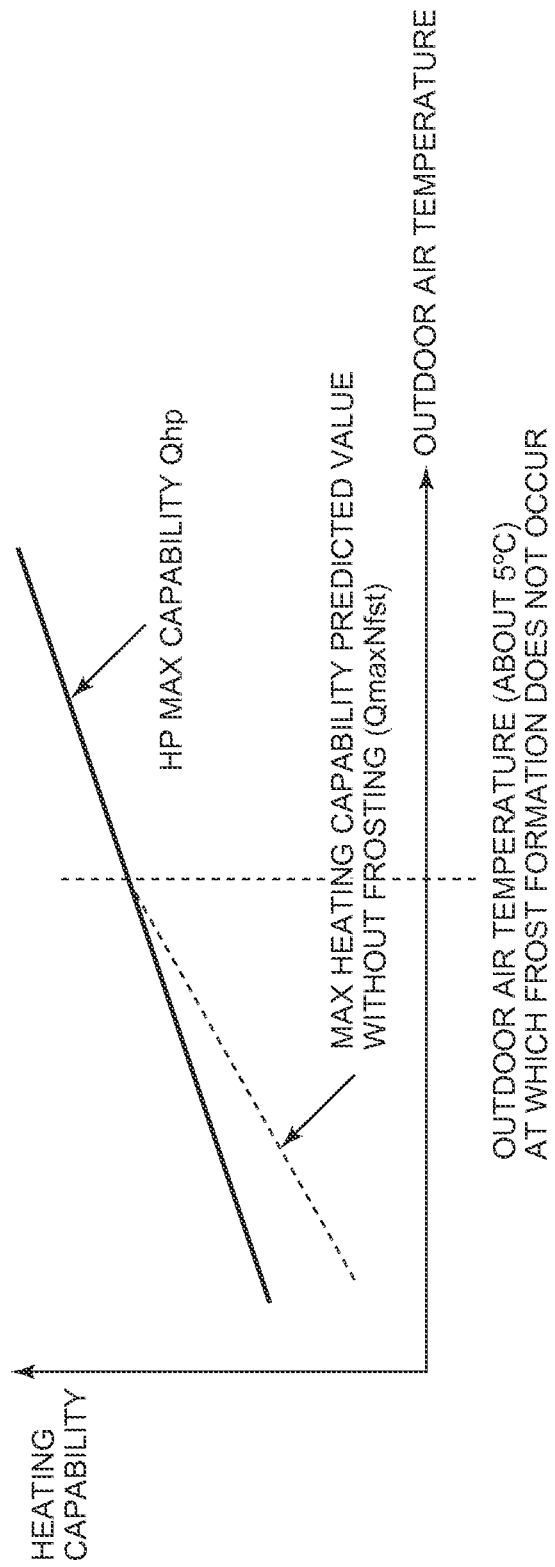
FIG. 5 is a diagram showing a relation between a maximum heating capability predicted value without frosting of a radiator at which an outdoor heat exchanger of FIG. 1 is not frosted and an outdoor air temperature.

Further, when it is immediately after the startup, the controller 32 advances from the step S4 to step S5, and calculates the maximum heating capability predicted value without frosting QmaxNfst (an estimated value) by use of Equation (III) mentioned above. FIG. 5 shows a relation between the maximum heating capability predicted value without frosting QmaxNfst and the outdoor air temperature (a tendency of a change of the maximum heating capability predicted value without frosting). The maximum heating capability Qhp which can be generated by the radiator 4 increases in proportion to rise of the outdoor air temperature Tam. Further, when the outdoor air temperature at which the outdoor heat exchanger 7 is not frosted is defined as about +5° C. and the operation is performed with the maximum heating capability Qhp as it is at +5° C. or less, the outdoor heat exchanger 7 is frosted. Therefore, as shown by broken lines in FIG. 5, there is a tendency that the maximum heating capability predicted value without frosting QmaxNfst decreases at an angle larger than the maximum heating capability Qhp in accordance with lowering of the outdoor air temperature.

In the step S5, the maximum heating capability predicted value without frosting QmaxNfst is calculated (estimated), and then in step S6, the controller 32 next calculates a target heating capability TGQech of a heating medium circulating circuit 23. The target heating capability TGQech of the heating medium circulating circuit 23 is calculated in accordance with Equation (IV) mentioned below.

$$TGQech=Qtgt-Q\text{max}Nfst \qquad (\text{IV})$$

That is, a shortage of the maximum heating capability predicted value without frosting QmaxNfst to the required heating capability Qtgt is the target heating capability TGQech of the heating medium circulating circuit 23.

Next, in step S7, the controller 32 compares the maximum heating capability predicted value without frosting QmaxNfst with the required heating capability Qtgt. That is, in the step S7, the controller judges whether or not the maximum heating capability predicted value without frosting QmaxNfst is smaller than the required heating capability Qtgt (QmaxNfst<Qtgt). When the predicted value is smaller, the controller advances to step S8 to define a target heating capability TGQhp of the radiator 4 as the maximum heating capability predicted value without frosting QmaxNfst (TGQhp=QmaxNfst), and operates the compressor 2 of the refrigerant circuit R and the like so that the radiator 4 generates the maximum heating capability predicted value without frosting QmaxNfst.

Furthermore, in the step S8, the controller 32 controls the energization to the heating medium heating electric heater 35 and the operation of the circulating pump 30 so that the target heating capability TGQech of the heating medium circulating circuit 23=the required heating capability Qtgt−the target heating capability TGQhp of the radiator 4 (the target heating capability TGQhp=the maximum heating capability predicted value without frosting QmaxNfst), on the basis of outputs of the heating medium heating electric heater temperature sensor 50 and the heating medium-air heat exchanger temperature sensor 55. That is, the controller 32 complements the shortage of the maximum heating capability predicted value without frosting QmaxNfst to the required heating capability Qtgt by the heating by the heating medium-air heat exchanger 40 of the heating medium circulating circuit 23. In consequence, comfortable heating of the vehicle interior can be realized and the frost formation to the outdoor heat exchanger 7 can be prevented.

On the other hand, for example, when the outdoor air temperature is comparatively high and it is judged in the step S7 that the maximum heating capability predicted value without frosting QmaxNfst is the required heating capability Qtgt or more (Qtgt≤QmaxNfst), the controller 32 advances to step S9 in which the controller stops the heating by the heating medium circulating circuit 23 (stops the circulating pump 30 and stops ECH due to non-energization of the heating medium heating electric heater 35: TGQech=0) and operates the compressor 2 of the refrigerant circuit R and the like so that the radiator 4 generates the required heating capability Qtgt (TGQhp=Qtgt). In consequence, useless heating by the heating medium circulating circuit 23 can be avoided to prevent increase of power consumption.

(6-4) Control when it is not Immediately after Startup of Heating Mode

By such coordinated heating of the radiator 4 and the heating medium circulating circuit 23 immediately after the startup as described above, the frost formation to the outdoor heat exchanger 7 is prevented. However, due to the subsequent running of the vehicle, water in the outdoor air adheres as the frost to the outdoor heat exchanger 7 in the heating mode. When this frost grows, heat exchange between the outdoor heat exchanger 7 and the outdoor air to be passed is remarkably obstructed, and an air-conditioning performance is deteriorated.

(6-5) Frost Formation Estimation of Outdoor Heat Exchanger

Thus, when it is not immediately after the startup of the heating mode in the step S4, i.e., for example, when the vehicle runs for a predetermined time or more from the startup, the controller 32 advances to step S10 to estimate the frost formation condition to the outdoor heat exchanger 7 by frost formation condition estimating means as a function which the controller 32 has. Next, an estimation example of the frost formation condition to the outdoor heat exchanger 7 will be described with reference to FIG. 6.

The controller 32 estimates the frost formation condition to the outdoor heat exchanger 7 on the basis of a current refrigerant evaporation temperature TXO of the outdoor heat exchanger 7 which is obtained from the outdoor heat exchanger pressure sensor 56 and a refrigerant evaporation temperature TXObase of the outdoor heat exchanger 7 in non-frosting in which the outdoor air is a low humidity environment and the outdoor heat exchanger 7 is not frosted. The controller 32 in this case determines the refrigerant evaporation temperature TXObase of the outdoor heat exchanger 7 in non-frosting by use of Equation (V) mentioned below.

$$TXObase = f(Tam, Nc, BLV, VSP) \quad \text{(V)}$$
$$= k1 \times Tam + k2 \times NC + k3 \times BLV + k4 \times VSP$$

Here, as to parameters of Equation (V), Tam is the above outdoor air temperature obtained from the outdoor air temperature sensor 33, NC is a number of revolution of the compressor 2, BLV is a blower voltage of the indoor blower 27, VSP is a velocity obtained from the velocity sensor 52, and k1 to k4 are coefficients which are obtained beforehand by experiments.

The above outdoor air temperature Tam is an index indicating a suction air temperature of the outdoor heat exchanger 7, and there is a tendency that the lower the outdoor air temperature Tam (the suction air temperature of the outdoor heat exchanger 7) is, the lower the temperature TXObase becomes. Therefore, the coefficient k1 is a positive value. It is to be noted that the index indicating the suction air temperature of the outdoor heat exchanger 7 is not limited to the outdoor air temperature Tam.

In addition, the number of revolution NC of the compressor 2 is an index indicating the refrigerant flow rate in the refrigerant circuit R, and there is a tendency that the higher the number of revolution NC is (the larger the refrigerant flow rate is), the lower the temperature TXObase becomes. Therefore, the coefficient k2 is a negative value.

In addition, the above blower voltage BLV is an index indicating a passing air volume of the radiator 4, and there is a tendency that the higher the blower voltage BLV is (the larger a passing air volume of the radiator 4 is), the lower the temperature TXObase becomes. Therefore, the coefficient k3 is a negative value. It is to be noted that the index indicating the passing air volume of the radiator 4 is not limited to this example, and may be a blower air volume of the indoor blower 27 or an opening SW of the air mix damper 28.

In addition, the above velocity VSP is an index indicating a passing air speed of the outdoor heat exchanger 7, and there is a tendency that the lower the velocity VSP is (the lower the passing air speed of the outdoor heat exchanger 7 is), the lower the temperature TXObase becomes. Therefore, the coefficient k4 is a positive value. It is to be noted that the index indicating the passing air speed of the outdoor heat exchanger 7 is not limited to this example, and may be a voltage of the outdoor blower 15.

It is to be noted that in the embodiment, as the parameters of Equation (V), the outdoor air temperature Tam, the number of revolution NC of the compressor 2, the blower voltage BLV of the indoor blower 27 and the velocity VSP are used, but a load of the vehicular air-conditioning device 1 may be added as a parameter to these parameters. It is considered that examples of an index indicating this load include the target outlet temperature TAO, the number of revolution NC of the compressor 2, the blower air volume of the indoor blower 27, an inlet air temperature of the radiator 4, and the radiator temperature Tci of the radiator 4, and there is a tendency that the larger the load is, the lower the temperature PXObase becomes. Furthermore, aging deterioration of the vehicle (the number of driving years or the number of driving times) may be added to the parameters. In addition, the parameters of Equation (V) are not limited to all of the above parameters, and one of the parameters or any combination of the parameters may be used.

Next, the controller 32 calculates a difference ΔTXO (ΔTXO=TXObase−TXO) between the refrigerant evaporation temperature TXObase in non-frosting which is obtained by substituting respective current parameter values into Equation (V) and the current refrigerant evaporation temperature TXO, and the controller judges that the frost formation to the outdoor heat exchanger 7 proceeds when there is continued for a predetermined frost formation condition estimating time a state where the refrigerant evaporation temperature TXO is lower than the refrigerant evaporation temperature TXObase in non-frosting and the difference ΔTXO is a predetermined frost formation detecting threshold ΔT1 or more.

Figure 6:
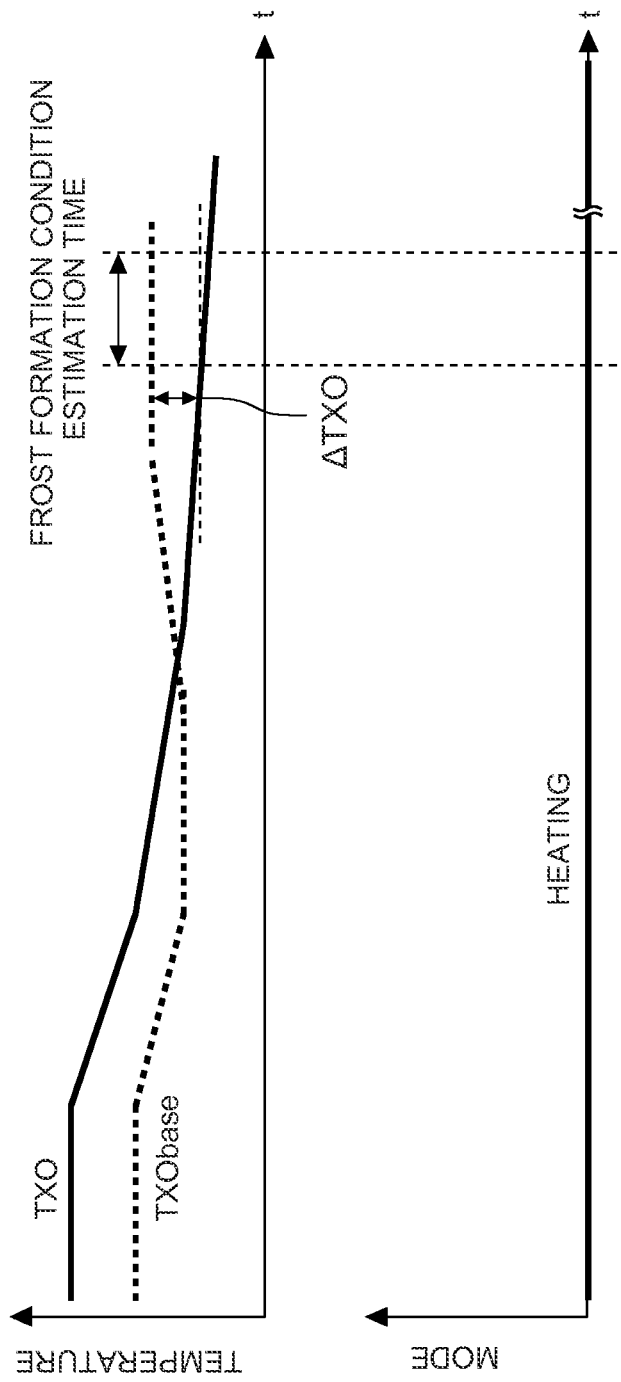
FIG. 6 is timing chart to explain a frost formation condition estimating operation of the outdoor heat exchanger by the controller of FIG. 2.

In FIG. 6, a solid line shows a change of the refrigerant evaporation temperature TXO of the outdoor heat exchanger 7, and a broken line shows a change of the refrigerant evaporation temperature TXObase in non-frosting. In the beginning of an operation start, the refrigerant evaporation temperature TXO of the outdoor heat exchanger 7 is high and is in excess of the refrigerant evaporation temperature TXObase in non-frosting. The interior temperature is raised accompanying progress of the heating mode, and the load of the vehicular air-conditioning device 1 lowers, and hence the abovementioned refrigerant flow rate or the passing air volume of the radiator 4 also lowers, and TXObase (the broken line of FIG. 6) calculated in accordance with Equation (V) rises.

On the other hand, when the frost starts to be formed in the outdoor heat exchanger 7, a heat exchange performance with the outdoor air worsens little by little, so that the refrigerant evaporation temperature TXO (the solid line) gradually drops and then falls below TXObase. Then, the drop of the refrigerant evaporation temperature TXO further proceeds, and the difference ΔTXO (TXObase−TXO) is larger than the frost formation detecting threshold ΔT1 or more. Furthermore, when this state is continued for a predetermined estimation time or more, the controller 32 judges frost formation progress. The meaning of the frost formation progress includes both a case where the frost is actually formed in the outdoor heat exchanger 7 and a case where there is a high possibility that the frost is formed in the outdoor heat exchanger 7, i.e., a case where the frost formation is predicted with a high probability.

(6-6) Frost Formation Inhibition to Outdoor Heat Exchanger

When the controller 32 judges the frost formation progress of the outdoor heat exchanger 7 in the step S10, the controller advances to step S11 to calculate the target heating capability TGQech of the heating medium circulating circuit 23 by use of Equation (VI) mentioned below.

$$TGQech=f(TXObase-TXO) \qquad (VI),$$

in which TGQech≥0. The difference ΔTXO (TXObase−TXO) between the refrigerant evaporation temperature TXObase of the outdoor heat exchanger 7 in non-frosting and the refrigerant evaporation temperature TXO of the outdoor heat exchanger 7 means a degree of frost formation to the outdoor heat exchanger 7 for such a reason as described above. That is, the controller 32 calculates the target heating capability TGQech of the heating medium circulating circuit 23 on the basis of the degree of the frost formation to the outdoor heat exchanger 7.

Further, in step S11, the controller 32 defines the target heating capability TGQhp of the radiator 4 as a value (Qtgt−TGQech) obtained by subtracting the target heating capability TGQech of the heating medium circulating circuit 23 from the required heating capability Qtgt. Thus, the target heating capability TGQhp of the radiator 4 is decreased, and hence the target heating capability TGQech of the heating medium circulating circuit 23 becomes a heating capability to inhibit or prevent the frost formation to the outdoor heat exchanger 7.

Figure 7:
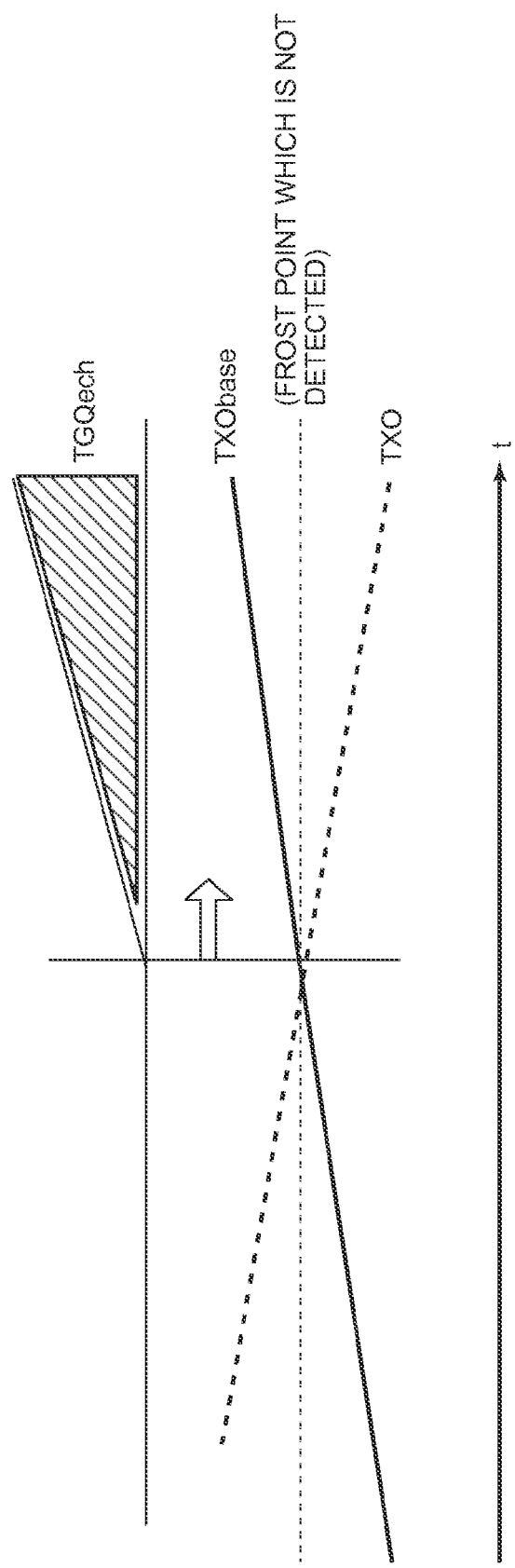
FIG. 7 is a diagram to explain an operation of the controller of FIG. 2.

FIG. 7 is a diagram showing a change of the target heating capability TGQech of the heating medium circulating circuit 23. In this case, the controller 32 cannot detect a frost point, and hence a fine broken line in FIG. 7 actually is not present, but the frost formation condition or the degree of the frost formation is detected in accordance with the value of TXObase−TXO. Further, when the state where TXO is lower than TXObase continues for the predetermined time as described above, the controller 32 increases TGQech in accordance with the increase of the difference ΔTXO (TXObase−TXO).

It is to be noted that the controller 32 judges in step S12 whether or not the target heating capability TGQhp of the radiator 4 which is calculated in the step S11 is larger than a remarkably small predetermined value Q1. Further, when TGQhp>Q1, the controller 32 advances to step S13 and controls the energization to the heating medium heating electric heater 35 and the operation of the circulating pump 30 to achieve the target heating capability TGQech (=f (TXObase−TXO)) calculated in accordance with Equation (VI) mentioned above, on the basis of the outputs of the heating medium heating electric heater temperature sensor 50 and the heating medium-air heat exchanger temperature sensor 55.

That is, the controller 32 controls the heating by the heating medium circulating circuit 23 on the basis of the degree of the frost formation to the outdoor heat exchanger 7, and the target heating capability TGQhp of the radiator 4 is obtained as a value (Qtgt−TGQech) by subtracting the target heating capability TGQech of the heating medium circulating circuit 23 from the required heating capability Qtgt.

On the other hand, when the target heating capability TGQhp of the radiator 4 which is calculated in the step S11 is excessively small and is the above value Q1 or less, the controller 32 advances from the step S12 to step 314, stops the compressor 2 of the refrigerant circuit R to stop the heating by the radiator 4 (stop HP: TGQhp=0), and controls the energization to the heating medium heating electric heater 35 and the operation of the circulating pump 30 so that the heating medium-air heat exchanger 40 of the heating medium circulating circuit 23 generates the required heating capability Qtgt (TGQech=Qtgt).

Here, when the target heating capability TGQhp of the radiator 4 is excessively small, the heating capability can be ignored, and the suction air temperature of the radiator 4 substantially matches a temperature of the air passed through the radiator 4, so that the refrigerant circuit R becomes inefficient. Thus, when the target heating capability TGQhp of the radiator 4 is excessively small (Q1 or less) as in the embodiment, the deterioration of the efficiency can be avoided in advance by achieving the target heating capability TGQhp=0 of the radiator 4 in the step S14.

It is to be noted that when the difference ΔTXO (TXObase−TXO) is ΔT1 or less in the step S10, the controller 32 judges that the frost formation to the outdoor heat exchanger 7 does not proceed, i.e., the frost does not grow yet, and the controller advances to the step S9, stops the heating by the heating medium circulating circuit 23 (stops the circulating pump 30, and does not energize the heating medium heating electric heater 35 to stop ECH: TGQech=0), and operates the compressor 2 of the refrigerant circuit R and the like so that the radiator 4 generates the required heating capability Qtgt (TGQhp=Qtgt).

As described above in detail, in the present invention, there is disposed the heating medium-air heat exchanger 40 of the heating medium circulating circuit 23 to heat the air to be supplied from the air flow passage 3 to the vehicle interior, and the controller 32 calculates the maximum heating capability predicted value without frosting Qmax-Nfst which can be generated by the radiator 4 in a range in which the outdoor heat exchanger 7 is not frosted, and controls the heating by the radiator 4 and the heating by the heating medium-air heat exchanger 40 of the heating medium circulating circuit 23 on the basis of the maximum heating capability predicted value without frosting QmaxNfst and the required heating capability Qtgt of the radiator 4 to achieve the required heating capability Qtgt without causing the frost formation to the outdoor heat exchanger 7. Therefore, even when the frost point which is determined in accordance with conditions of the temperature and humidity of the outdoor air and at which the outdoor heat exchanger 7 is frosted cannot be detected, the required heating capability Qtgt is achieved by the coordinated heating of the radiator 4 and the heating medium circulating circuit 23 without causing the frost formation to the outdoor heat exchanger 7, and it is possible to realize the comfortable heating of the vehicle interior.

In this case, when the maximum heating capability predicted value without frosting QmaxNfst is smaller than the required heating capability Qtgt, the controller 32 defines the target heating capability TGQhp of the radiator 4 as the maximum heating capability predicted value without frosting QmaxNfst, and complements the shortage to the required heating capability Qtgt by the heating by the heating medium-air heat exchanger 40 of the heating medium circulating circuit 23, and when the maximum heating capability predicted value without frosting QmaxNfst is the required heating capability Qtgt or more, the controller defines the target heating capability TGQhp of the radiator 4 as the required heating capability Qtgt, and stops the heating by the heating medium circulating circuit 23, so that it is possible to minimize the deterioration of the efficiency due to the heating by the heating medium circulating circuit 23. In consequence, it is possible to effectively inhibit the disadvantage that the cruising range decreases especially in the electric car.

In addition, the controller 32 calculates the maximum heating capability predicted value without frosting QmaxNfst on the basis of the outdoor air temperature Tam or on the basis of time, solar radiation, rainfall, location and weather conditions in addition to the outdoor air temperature, and hence it is possible to precisely estimate the maximum heating capability predicted value without frosting QmaxNfst at which the outdoor heat exchanger 7 is not frosted, i.e., as a result, it is possible to precisely estimate the frost point and to effectively prevent the frost formation to the outdoor heat exchanger 7.

Further, the controller 32 executes the above control immediately after the startup of the heating mode of the vehicular air-conditioning device 1, so that it is possible to prevent the disadvantage that the frost starts to be formed to the outdoor heat exchanger 7 by the startup from a state where the vehicle is stopped, i.e., a state where the outdoor heat exchanger 7 is not frosted yet, and it is possible to inhibit the growth of the formed frost due to the subsequent running of the vehicle as much as possible. In addition, the controller performs the complementing by the heating medium circulating circuit 23 by estimating the frost point only immediately after the startup, and hence it is also possible to achieve reduction of power consumption.

In addition, the controller 32 estimates the frost formation condition to the outdoor heat exchanger 7, and executes the heating by the heating medium circulating circuit 23 when it is not immediately after the startup, when the frost is formed to the outdoor heat exchanger 7 or when the frost formation to the outdoor heat exchanger 7 is predicted, and hence it is possible to acquire the heating capability of the vehicle interior while effectively preventing or inhibiting the frost formation to the outdoor heat exchanger 7 during the running after the startup.

Furthermore, the controller 32 calculates the target heating capability TGQech of the heating medium circulating circuit 23 which inhibits or prevents the frost formation to the outdoor heat exchanger 7, on the basis of the degree of the frost formation to the outdoor heat exchanger 7, and the controller obtains the value of the target heating capability TGQhp of the radiator 4 by subtracting the target heating capability TGQech of the heating medium circulating circuit 23 from the required heating capability Qtgt. Therefore, the heating by the heating medium circulating circuit 23 is precisely controlled while preventing or inhibiting the frost formation to the outdoor heat exchanger 7, and hence comfortable heating of the vehicle interior can be realized.

Additionally, also in this case, it is possible to minimize the deterioration of the efficiency in accordance with the heating by the heating medium circulating circuit 23, and hence it is possible to effectively inhibit the decrease of the cruising range of the electric car.

In this case, when the target heating capability TGQhp of the radiator 4 is smaller than the predetermined value, the controller 32 stops the operation of the compressor 2, and hence the deterioration of the efficiency in a situation where the heating of the radiator 4 is excessively small can be avoided in advance.

In particular, the controller 32 estimates the frost formation condition to the outdoor heat exchanger 7 or the degree of the frost formation to the outdoor heat exchanger 7 on the basis of the refrigerant evaporation temperature TXO of the outdoor heat exchanger 7 and the refrigerant evaporation temperature TXObase of the outdoor heat exchanger 7 in non-frosting. Therefore, the frost formation to the outdoor heat exchanger 7 can precisely be judged, and the coordinated control with the heating medium circulating circuit 23 can be executed. In consequence, the heating by the heating medium-air heat exchanger 40 of the heating medium circulating circuit 23 can precisely be controlled, and it is possible to inhibit the increase of the power consumption.

Further, as in the embodiment, when the auxiliary heating means is constituted of the heating medium circulating circuit 23 which has the heating medium-air heat exchanger 40 to heat the air to be supplied from the air flow passage 3 to the vehicle interior, the heating medium heating electric heater 35 and the circulating pump 30 and which circulates the heating medium heated by the heating medium heating electric heater 35 through the heating medium-air heat exchanger 40 by the circulating pump 30, the electric heater having a high voltage can be disposed at a position distant from the vehicle interior, and hence electrically safer heating of the vehicle interior can be realized.

Embodiment 2

Figure 8:
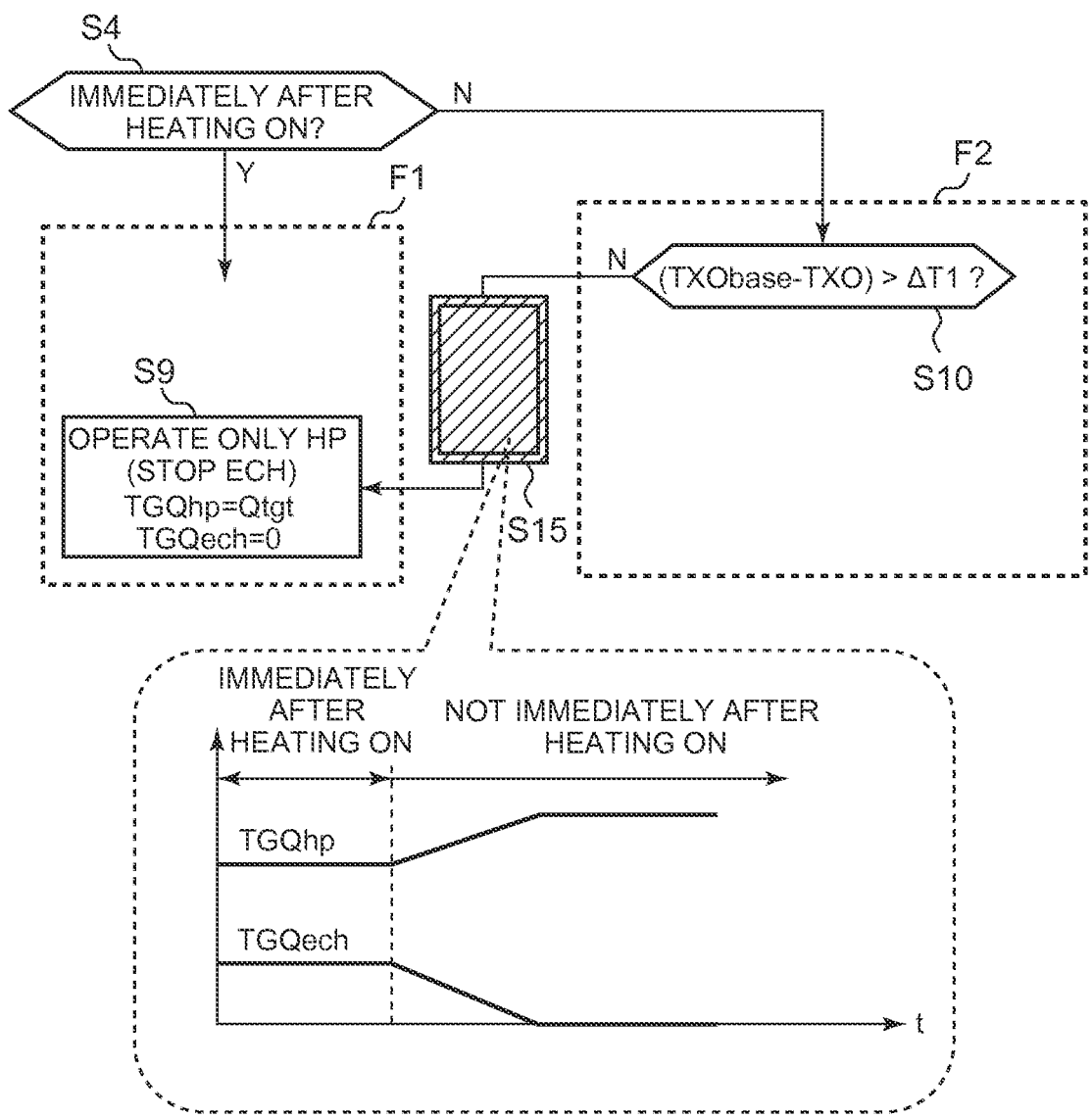
FIG. 8 is a flowchart to explain an operation of another embodiment of the controller of FIG. 2.

Next, FIG. 8 shows another embodiment of a flowchart of a controller 32. It is to be noted that in this drawing, the same portions as those shown by F1 and F2 in the flowchart of FIG. 4 are denoted with the same reference numerals, and details are omitted. In this embodiment, in step S10, a difference ΔTXO (TXObase−TXO) is ΔT1 or less, and frost formation to an outdoor heat exchanger 7 does not proceed. That is, when it is judged that frost is not formed to the outdoor heat exchanger 7, the controller directly advances to step S9, and does not bring a heating medium heating electric heater 35 into a non-energized state, but executes stage control of step S15 in this case.

FIG. 8 shows the stage control of the step S15 of this embodiment in its lower part. When it is not immediately after startup of a heating mode any more, i.e., when the controller advances from step S4 to the step S10 and the difference ΔTXO (TXObase−TXO) is ΔT1 or less, the controller 32 decreases a target heating capability TGQech of the heating medium circulating circuit 23 gradually or in stages in the step S15.

On the other hand, a target heating capability TGQhp of a radiator 4 is calculated in accordance with TGQhp=Qtgt−TGQech similarly to step S11. Therefore, the target heating capability TGQhp of the radiator 4 is increased gradually or in stages. Further, the controller finally advances to the step S9 in which heating by a heating medium circulating circuit 23 is stopped (a circulating pump 30 is stopped and the heating medium heating electric heater 35 is non-energized to stop ECH: TGQech=0), and the controller operates a compressor 2 of a refrigerant circuit R and the like so that the radiator 4 generates a required heating capability Qtgt (TGQhp=Qtgt).

Here, a change of the heating capability to be generated by the radiator 4 under operation control of the compressor 2 might be delayed from decrease of the heating capability by a heating medium-air heat exchanger 40 due to stop of supply of a high-temperature heating medium to the heating medium-air heat exchanger 40 of the heating medium circulating circuit 23. In addition, when the controller advances from the step S10 to the step S9 in which the target heating capability TGQech of the heating medium circulating circuit 23 is 0 and the target heating capability TGQhp of the radiator 4 rapidly increases toward the required heating capability Qtgt, there is a risk that frost is transiently formed to the outdoor heat exchanger 7 depending on environmental conditions.

However, when the controller 32 judges that the frost is not formed to the outdoor heat exchanger 7 as in this embodiment, in the step S15, the controller lowers the heating by the heating medium-air heat exchanger 40 of the heating medium circulating circuit 23 gradually or in stages and finally stops the heating. In this case, it is possible to inhibit the disadvantage that a temperature of air to be blown out to a vehicle interior rapidly varies due to such delay of the increase of the heating capability of the radiator 4. In addition, the target heating capability TGQhp of the radiator 4 is increased gradually or in stages, and hence transient frost formation to the outdoor heat exchanger 7 can be prevented or inhibited.

Embodiment 3

Figure 9:
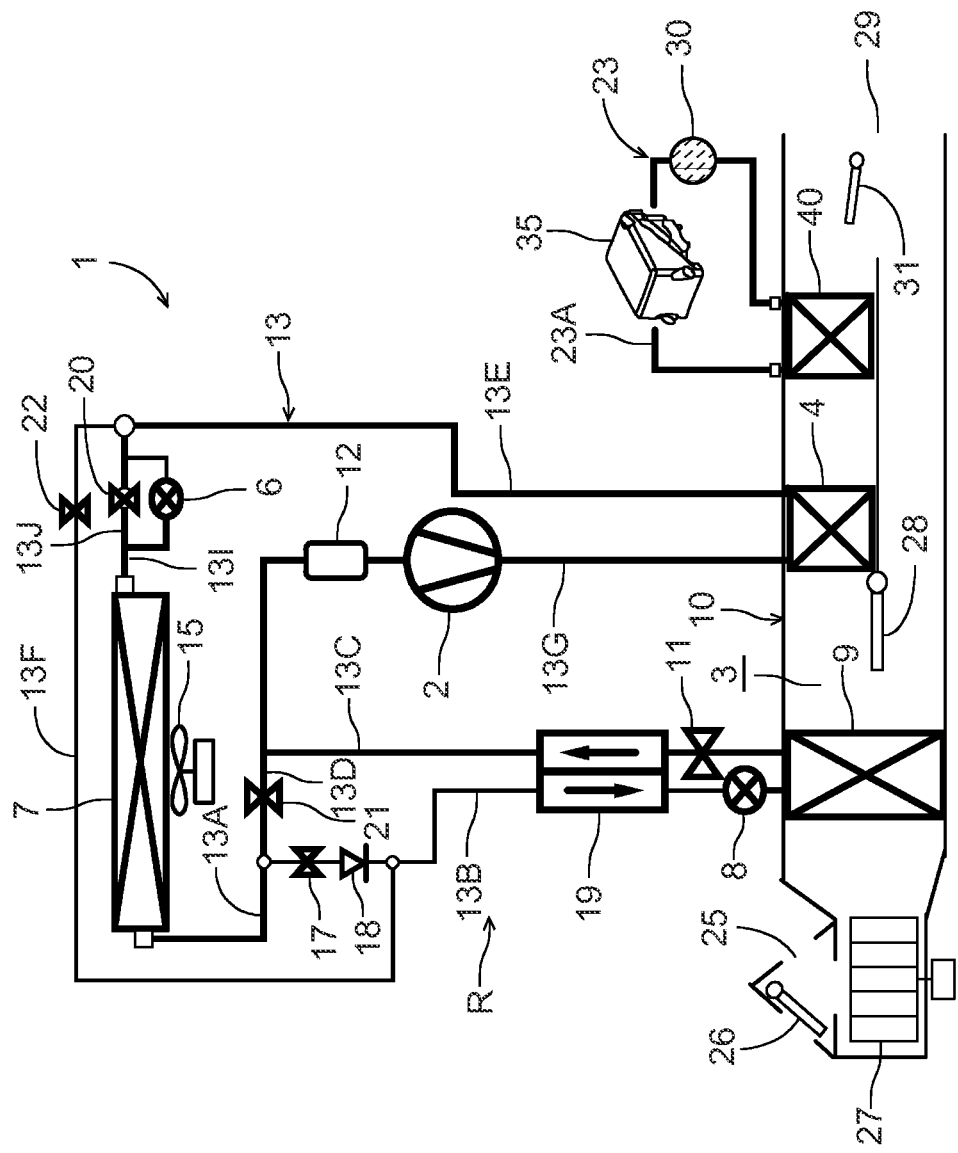
FIG. 9 is a constitutional view of a vehicular air-conditioning device of another embodiment to which the present invention is applied.

Next, FIG. 9 shows a constitutional view of still another embodiment of the vehicular air-conditioning device 1 of the present invention. In this embodiment, in an outdoor heat exchanger 7, a receiver drier portion 14 and a subcooling portion 16 are not disposed, and a refrigerant pipe 13A extended out from the outdoor heat exchanger 7 is connected to a refrigerant pipe 13B via a solenoid valve 17 and a check valve 18. In addition, a refrigerant pipe 13D branched from the refrigerant pipe 13A is similarly connected to a refrigerant pipe 13C on a downstream side of an internal heat exchanger 19 via a solenoid valve 21.

The other constitution is similar to the example of FIG. 1. The present invention is also effective in the vehicular air-conditioning device 1 of a refrigerant circuit R in which the outdoor heat exchanger 7 which does not have the receiver drier portion 14 and the subcooling portion 16 is employed in this manner.

Embodiment 4

Figure 10:
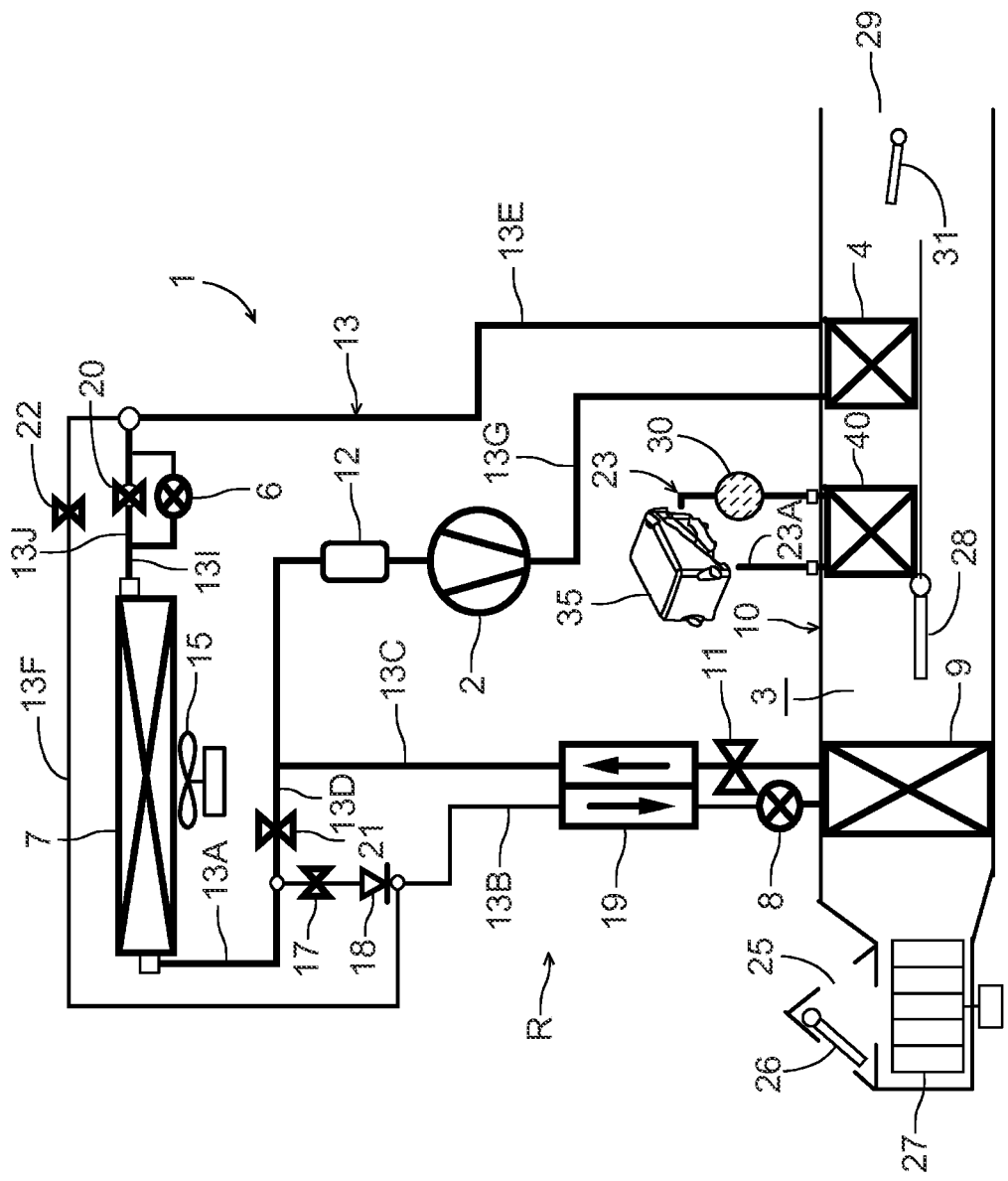
FIG. 10 is a constitutional view of a vehicular air-conditioning device of still another embodiment to which the present invention is applied.

Next, FIG. 10 shows a constitutional view of a further embodiment of the vehicular air-conditioning device 1 of the present invention. It is to be noted that a refrigerant circuit R of this embodiment is similar to FIG. 9. Additionally, in this case, a heating medium-air heat exchanger 40 of a heating medium circulating circuit 23 is disposed on an upstream side of a radiator 4 to flow of air of an air flow passage 3, which is a downstream side of an air mix damper 28. The other constitution is similar to FIG. 9.

In this case, the heating medium-air heat exchanger 40 is positioned on the upstream side of the radiator 4 in the air flow passage 3, and hence during an operation of the heating medium circulating circuit 23, the air is heated by the heating medium-air heat exchanger 40, and then flows into the radiator 4. The present invention is also effective in the vehicular air-conditioning device 1 in which the heating medium-air heat exchanger 40 is disposed on the upstream side of the radiator 4 in this manner, and especially in this case, any problems do not occur due to a low temperature of a heating medium in the heating medium circulating circuit 23. In consequence, coordinated heating with the radiator 4 is facilitated, and so-called preliminary operation to beforehand heat the heating medium is not required, but the air passed through the heating medium-air heat exchanger 40 disadvantageously flows into the radiator 4, and hence a temperature difference between the air and the radiator 4 becomes smaller, which causes the danger that a heat exchange efficiency deteriorates. On the other hand, when the heating medium-air heat exchanger 40 is disposed on the downstream side of the radiator 4 to the flow of the air of the air flow passage 3 as shown in FIG. 1 and FIG. 9, the air heated by the heating medium-air heat exchanger 40 does not flow into the radiator 4, and the temperature difference between the temperature of the radiator 4 and that of the air can be acquired to prevent deterioration of a heat exchange performance in the radiator 4, as compared with the case that the heating medium-air heat exchanger 40 is disposed on the upstream side of the radiator as shown in FIG. 10.

Embodiment 5

Figure 11:
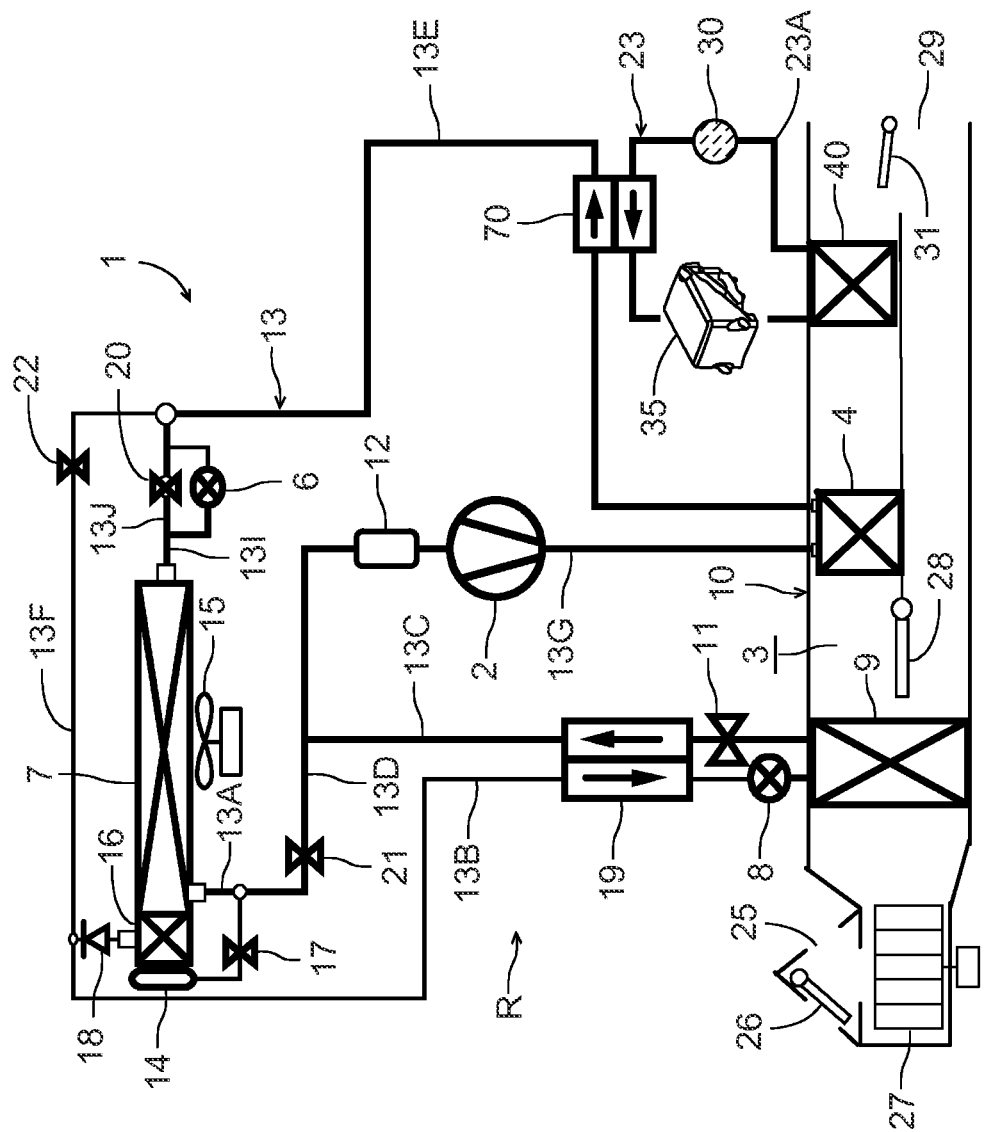
FIG. 11 is a constitutional view of a vehicular air-conditioning device of a further embodiment to which the present invention is applied.

Next, FIG. 11 shows a constitutional view of a further embodiment of the vehicular air-conditioning device 1 of the present invention. Basic constitutions of a refrigerant circuit R and a heating medium circulating circuit 23 of this embodiment are similar to those of FIG. 1, but in the heating medium circulating circuit 23, a heating medium-refrigerant heat exchanger 70 is disposed. The heating medium-refrigerant heat exchanger 70 performs heat exchange between a heating medium pipe 23A extended out from a circulating pump 30 and a refrigerant pipe 13E extended out from a radiator 4 of the refrigerant circuit R, and in the heating medium-refrigerant heat exchanger 70, a heating medium discharged from the circulating pump 30 is subjected to a heating operation from a refrigerant flowing out from the radiator 4. In consequence, heat can be collected from the refrigerant passed through the radiator 4 by the heating medium circulating through the heating medium circulating circuit 23.

Thus, in the heating medium circulating circuit 23, there is disposed the heating medium-refrigerant heat exchanger 70 which collects heat from the refrigerant passed through the radiator 4, and hence the heat which the refrigerant passed through the radiator 4 has is collected by the heating medium flowing in the heating medium circulating circuit 23 and conveyed to a heating medium-air heat exchanger 40, so that it is possible to more efficiently support the heating.

Embodiment 6

Figure 12:
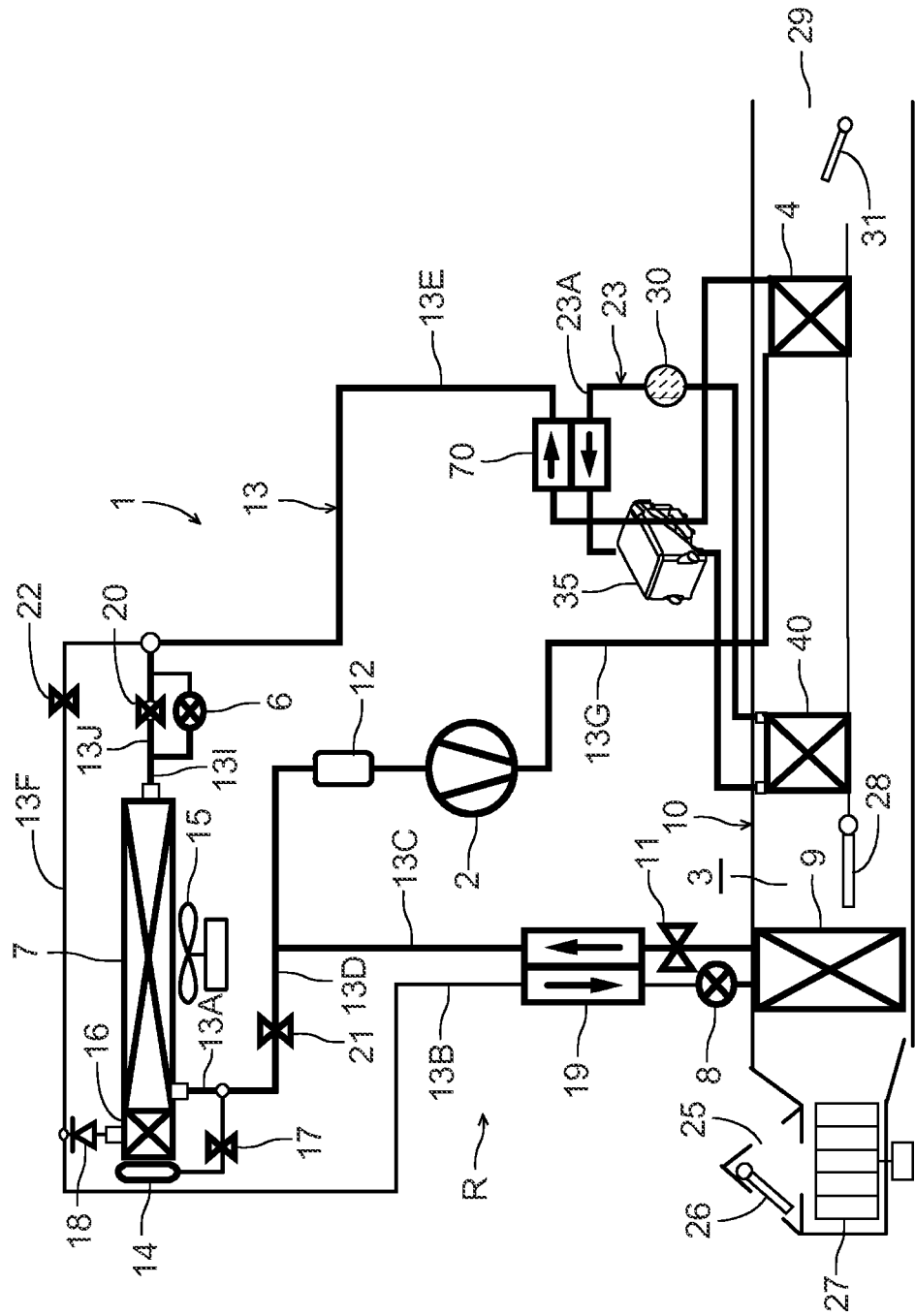
FIG. 12 is a constitutional view of a vehicular air-conditioning device of a further embodiment to which the present invention is applied.

Next, FIG. 12 shows a constitutional view of a further embodiment of the vehicular air-conditioning device 1 of the present invention. A refrigerant circuit R and a heating medium circulating circuit 23 of this embodiment are similar to those of FIG. 11, but a heating medium-air heat exchanger 40 of the heating medium circulating circuit 23 is disposed on an upstream side of a radiator 4 and a downstream side of an air mix damper 28 to flow of air of an air flow passage 3. Also according to such a constitution, heat which a refrigerant discharged from the radiator 4 has is collected by a heating medium flowing in the heating medium circulating circuit 23 in a heating medium-refrigerant heat exchanger 70, and conveyed to the heating medium-air heat exchanger 40, so that it is possible to more efficiently support the heating.

Embodiment 7

Figure 13:
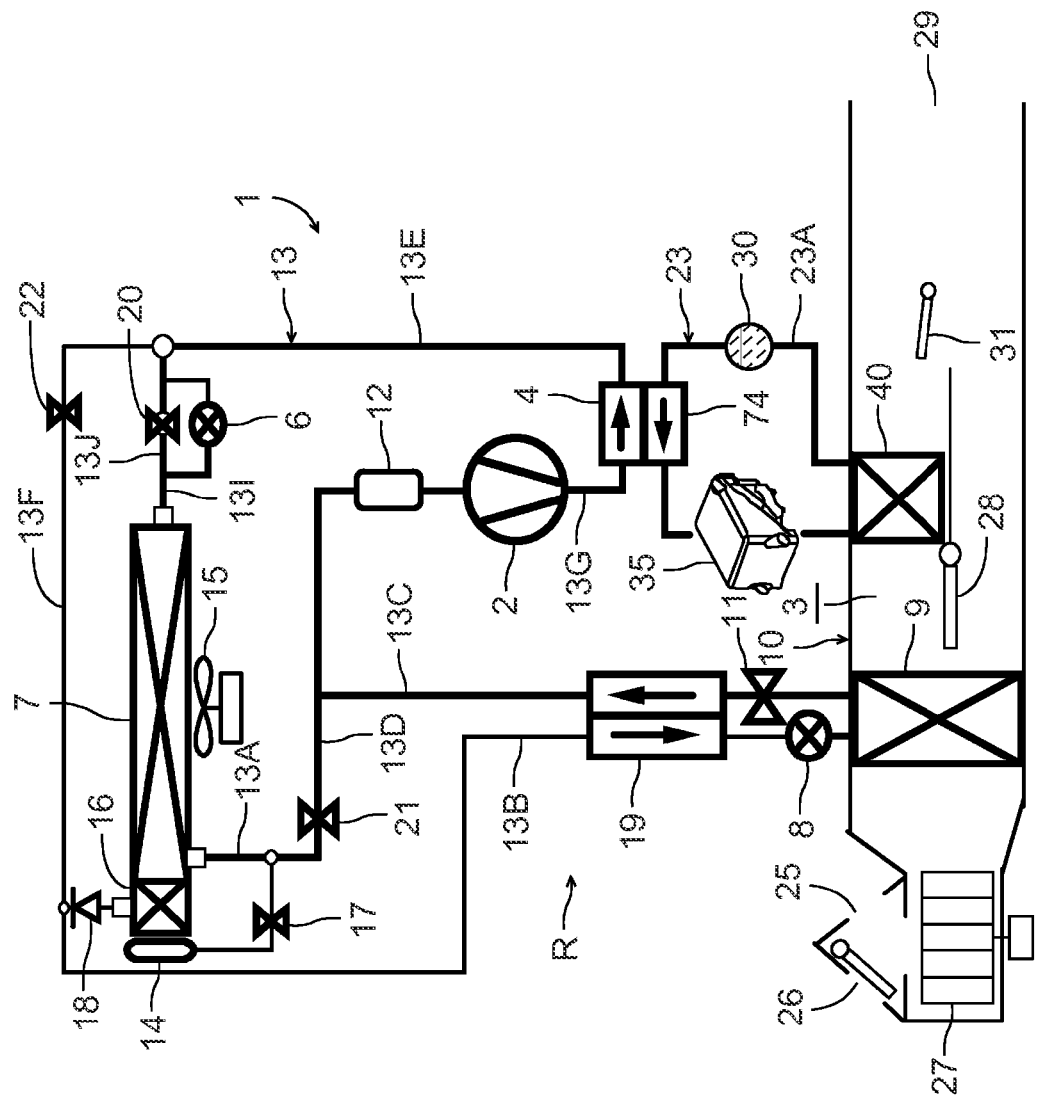
FIG. 13 is a constitutional view of a vehicular air-conditioning device of a further embodiment to which the present invention is applied.

Next, FIG. 13 shows a constitutional view of a further embodiment of the vehicular air-conditioning device 1 of the present invention. Pipe constitutions of a refrigerant circuit R and a heating medium circulating circuit 23 of this embodiment are basically similar to those of FIG. 1, but a radiator 4 is not disposed in an air flow passage 3, and is disposed outside the air flow passage. Instead, a heating medium-refrigerant heat exchanger 74 in this case is disposed in a heat exchange relation in the radiator 4.

The heating medium-refrigerant heat exchanger 74 is connected to a heating medium pipe 23A between a circulating pump 30 of the heating medium circulating circuit 23 and a heating medium heating electric heater 35, and the heating medium-air heat exchanger 40 of the heating medium circulating circuit 23 is disposed in the air flow passage 3. According to such a constitution, there is performed heat exchange between a heating medium discharged from the circulating pump 30 and a refrigerant flowing through the radiator 4, and the heating medium is heated by the refrigerant, next heated by the heating medium heating electric heater 35 (in a case where the heater is energized to generate heat), and then radiates heat in a heating medium-air heat exchanger 40, thereby heating air to be supplied from the air flow passage 3 to a vehicle interior.

Also in the vehicular air-conditioning device 1 of such a constitution, when a heating capability by the radiator 4 runs short, the heating medium heating electric heater 35 is energized to heat the heating medium flowing in the heating medium circuit 23A, so that it is possible to support the heating and realize electrically safer heating of the vehicle interior, as compared with a case where the electric heater is disposed in the air flow passage 3 as described later.

Embodiment 8

Figure 14:
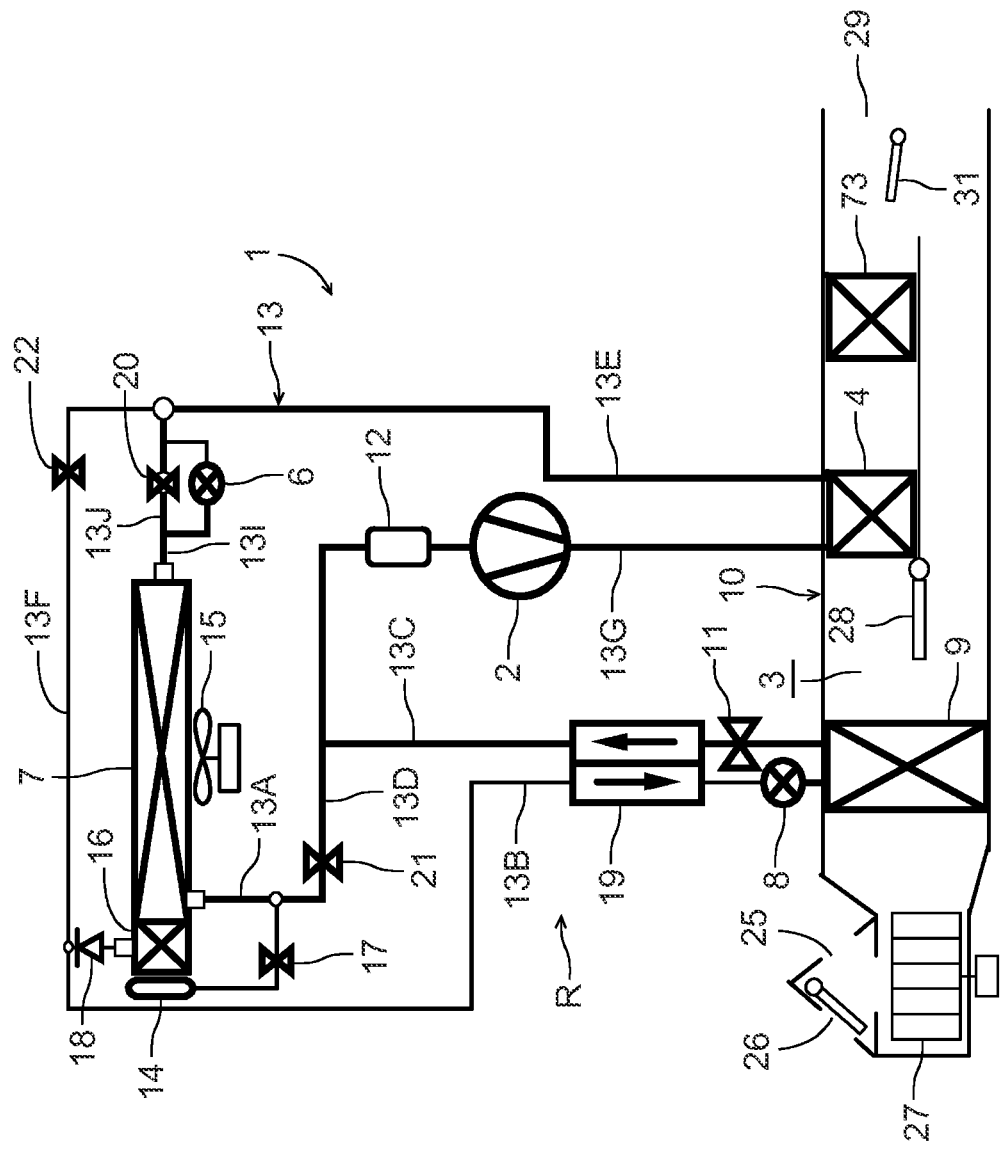
FIG. 14 is a constitutional view of a vehicular air-conditioning device of a further embodiment to which the present invention is applied.
Figure 15:
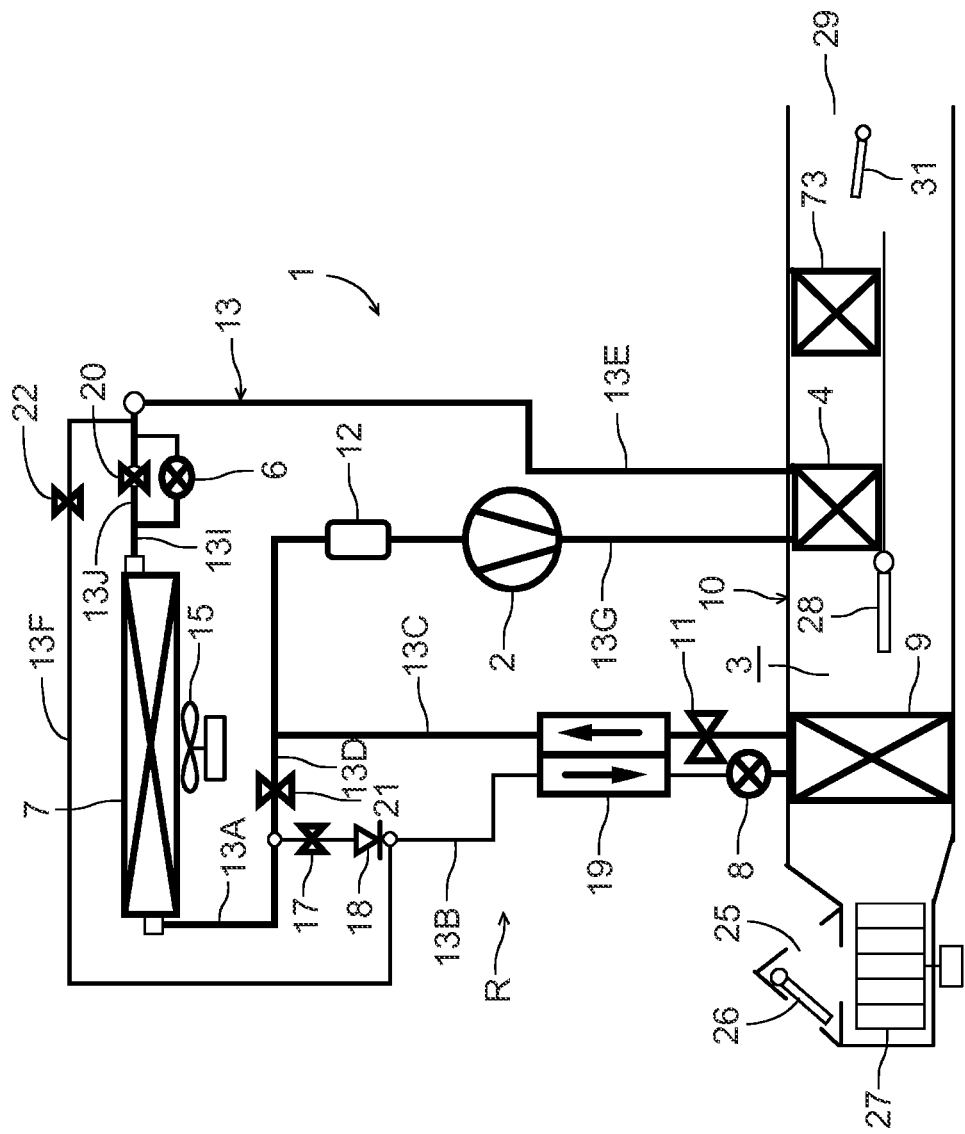
FIG. 15 is a constitutional view of a vehicular air-conditioning device of a still further embodiment to which the present invention is applied.

It is to be noted that, in the above respective embodiments, a heating medium circulating circuit 23 is employed as auxiliary heating means, but the auxiliary heating means may be constituted of a usual electric heater (e.g., a PTC heater) 73. FIG. 14 shows a constitutional example corresponding to FIG. 1 in this case, and FIG. 15 shows a constitutional example corresponding to FIG. 9. In FIG. 14 and FIG. 15, the heating medium circulating circuit 23 of FIG. 1 and FIG. 9 is replaced with the electric heater 73 in this case.

The other constitution and control are basically similar, and a controller 32 controls energization of the electric heater 73 in place of the circulating pump 30 and the heating medium heating electric heater 35 of the heating medium circulating circuit 23, to complement a heating capability of a radiator 4 by heat generated by the electric heater in the same manner as described above, so that detailed descriptions are omitted. Thus, air to be supplied into a vehicle interior may be heated by the electric heater 73, and such a constitution is advantageously simplified as compared with the case that the heating medium circulating circuit 23 is used.

Needless to say, the electric heater 73 may be disposed on an air upstream side of a radiator 4 of FIG. 14 or FIG. 15 as in the case of FIG. 10, and in this case, there is the effect that it is possible to eliminate the disadvantage that the temperature of the air to be supplied into the vehicle interior lowers in an initial stage of start of energization to the electric heater 73.

It is to be noted that in the above respective embodiments, the controller 32 as frost formation condition estimating means of the outdoor heat exchanger 7 estimates a frost formation condition or a degree of frost formation to the outdoor heat exchanger 7 on the basis of a refrigerant evaporation temperature TXO of the outdoor heat exchanger 7 and a refrigerant evaporation temperature TXObase of the outdoor heat exchanger 7 in non-frosting, but the inventions other than claim 10 are not limited to the embodiments, and the estimating may be performed by a procedure similar to that of the case of TXO and TXObase, on the basis of a refrigerant evaporation pressure PXO of the outdoor heat exchanger 7 and a refrigerant evaporation pressure PXObase of the outdoor heat exchanger 7 in non-frosting. In addition, for example, an actual heating capability which is the actual heating capability of the radiator 4 is compared with a heating capability in non-frosting which is the heating capability of the radiator 4 when the outdoor heat exchanger 7 is not frosted, and it may be estimated that the outdoor heat exchanger 7 is frosted, when the actual heating capability is lower than the heating capability in non-frosting.

Additionally, in the embodiments, the present invention is applied to the vehicular air-conditioning device 1 which changes and executes respective operation modes such as a heating mode, a dehumidifying and heating mode, a dehumidifying and cooling mode and a cooling mode, but the present invention is not limited to these embodiments, and is also effective for a vehicular air-conditioning device which only performs the heating mode.

Furthermore, in the embodiments, the heating medium circulating circuit 23 has been described as the example of the auxiliary heating means, but the inventions other than claim 11 are not limited to the embodiments, and in the air flow passage 3, for example, the electric heater (the auxiliary heating means) may be disposed.

In addition, the constitution of the refrigerant circuit R and the respective numeric values described in each of the above embodiments are not limited, and are, needless to say, changeable without departing from the gist of the present invention.

| Description of Reference Numerals | |
|---|---|
| 1 | vehicular air-conditioning device |
| 2 | compressor |
| 3 | air flow passage |
| 4 | radiator |
| 6 | outdoor expansion valve |
| 7 | outdoor heat exchanger |
| 8 | indoor expansion valve |
| 9 | heat absorber |
| 11 | evaporation capability control valve |
| 17, 20, 21 and 22 | solenoid valve |
| 23 | heating medium circulating circuit (auxiliary heating means) |
| 26 | suction changing damper |
| 27 | indoor blower (blower fan) |
| 28 | air mix damper |
| 30 | circulating pump (circulating means) |
| 32 | controller (control means) |
| 35 | heating medium heating electric heater (electric heater) |
| 40 | heating medium-air heat exchanger |
| R | refrigerant circuit |

The invention claimed is:

1. A vehicular air-conditioning device comprising:
a compressor which compresses a refrigerant;
an air flow passage through which air to be supplied into a vehicle interior flows;
a radiator which lets the refrigerant radiate heat to heat the air to be supplied from the air flow passage into the vehicle interior;
a heat absorber which lets the refrigerant absorb heat to cool the air to be supplied from the air flow passage into the vehicle interior;
an outdoor heat exchanger disposed outside the vehicle interior to let the refrigerant radiate or absorb heat; and
control means,
the control means being configured to execute at least a heating mode in which the refrigerant discharged from the compressor radiates heat in the radiator and the refrigerant by which heat has been radiated is decompressed and then absorbs heat in the outdoor heat exchanger,
the vehicular air-conditioning device comprising:
auxiliary heating means for heating the air to be supplied from the air flow passage into the vehicle interior,
wherein the control means calculates a maximum heating capability predicted value without frosting QmaxNfst which is a target value of a maximum heating capability to be generated by the radiator in a range in which the outdoor heat exchanger is not frosted, and
the control means controls the heating by the radiator and the heating by the auxiliary heating means on the basis of the maximum heating capability predicted value without frosting QmaxNfst and a required heating capability Qtgt which is the heating capability required for the radiator to achieve the required heating capability Qtgt without causing frost formation to the outdoor heat exchanger.

2. The vehicular air-conditioning device according to claim 1,
wherein the control means defines a target heating capability TGQhp of the radiator as the maximum heating capability predicted value without frosting QmaxNfst, and complements a shortage of the heating capability to the required heating capability Qtgt by the heating by the auxiliary heating means, when the maximum heating capability predicted value without frosting QmaxNfst is smaller than the required heating capability Qtgt.

3. The vehicular air-conditioning device according to claim 1,
wherein the control means defines the target heating capability TGQhp of the radiator as the required heating capability Qtgt, and stops the heating by the auxiliary heating means, when the maximum heating capability predicted value without frosting QmaxNfst is the required heating capability Qtgt or more.

4. The vehicular air-conditioning device according to claim 1,
wherein the control means calculates the maximum heating capability predicted value without frosting QmaxNfst on the basis of an outdoor air temperature or on the basis of time, solar radiation, rainfall, location, and weather conditions in addition to the outdoor air temperature.

5. The vehicular air-conditioning device according to claim 1,
wherein the control means executes the control immediately after startup.

6. The vehicular air-conditioning device according to claim 1,
wherein the control means has frost formation condition estimating means for estimating a frost formation condition to the outdoor heat exchanger, and in a case where it is not immediately after the startup, the control means executes the heating by the auxiliary heating means on the basis of the estimation of the frost formation condition estimating means, when the frost formation to the outdoor heat exchanger occurs or when the frost formation to the outdoor heat exchanger is predicted.

7. The vehicular air-conditioning device according to claim 6,
wherein the control means calculates a target heating capability TGQech of the auxiliary heating means for inhibiting or preventing the frost formation to the outdoor heat exchanger on the basis of a degree of the frost formation to the outdoor heat exchanger, and obtains a value of the target heating capability TGQhp of the radiator by subtracting the target heating capability TGQech of the auxiliary heating means from the required heating capability Qtgt.

8. The vehicular air-conditioning device according to claim 7,
wherein the control means stops an operation of the compressor, when the target heating capability TGQhp of the radiator is smaller than a predetermined value.

9. The vehicular air-conditioning device according to claim 6,
wherein the control means lowers the heating by the auxiliary heating means gradually or in stages and finally stops the heating, when it is estimated that the outdoor heat exchanger is not frosted on the basis of the estimation of the frost formation condition estimating means.

10. The vehicular air-conditioning device according to claim 6,
wherein the control means estimates the frost formation condition or the degree of the frost formation to the outdoor heat exchanger on the basis of a refrigerant evaporation temperature TXO of the outdoor heat exchanger and a refrigerant evaporation temperature TXObase of the outdoor heat exchanger in non-frosting.

11. The vehicular air-conditioning device according to claim 1,
wherein the auxiliary heating means is constituted of a heating medium circulating circuit which has a heating medium-air heat exchanger to heat the air to be supplied from the air flow passage into the vehicle interior, an electric heater and circulating means and which circulates a heating medium heated by the electric heater through the heating medium-air heat exchanger by the circulating means.

* * * * *